US012710576B2

(12) United States Patent
Huseby et al.

(10) Patent No.: US 12,710,576 B2
(45) Date of Patent: Aug. 18, 2026

(54) MULTILAYER OPTICAL FILM

(71) Applicant: 3M INNOVATIVE PROPERTIES COMPANY, St. Paul, MN (US)

(72) Inventors: Kevin T. Huseby, Oakdale, MN (US); Stephen A. Johnson, Woodbury, MN (US); Samuel A. Minno, St. Paul, MN (US); Lin Zhao, Woodbury, MN (US); William T. Fay, Woodbury, MN (US); David T. Yust, Woodbury, MN (US); Adam D. Haag, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 231 days.

(21) Appl. No.: 18/279,638

(22) PCT Filed: Feb. 17, 2022

(86) PCT No.: PCT/IB2022/051435

§ 371 (c)(1),
(2) Date: Aug. 31, 2023

(87) PCT Pub. No.: WO2022/195372

PCT Pub. Date: Sep. 22, 2022

(65) Prior Publication Data

US 2024/0184030 A1 Jun. 6, 2024

Related U.S. Application Data

(60) Provisional application No. 63/161,046, filed on Mar. 15, 2021.

(51) Int. Cl.

*G02B 5/30* (2006.01)
*G02B 5/26* (2006.01)

(52) U.S. Cl.

CPC ............... *G02B 5/305* (2013.01); *G02B 5/26* (2013.01); *G02B 5/3083* (2013.01)

(58) Field of Classification Search

CPC ........ G02B 5/305; G02B 5/26; G02B 5/3083; G02B 5/287; G02B 5/0841; G02B 5/3025;

(Continued)

(56) References Cited

U.S. PATENT DOCUMENTS

| | | | |
|---|---|---|---|
| 3,711,176 | A | 1/1973 | Alfrey, Jr. et al. |
| 5,103,337 | A | 4/1992 | Schrenk et al. |

(Continued)

FOREIGN PATENT DOCUMENTS

| | | | |
|---|---|---|---|
| EP | 0488544 | B1 | 1/1998 |
| WO | 1999036258 | A1 | 7/1999 |

(Continued)

OTHER PUBLICATIONS

International Search Report received for PCT International Application No. PCT/IB2022/051435, mailed on May 17, 2022, 4 pages.

*Primary Examiner* — Stephone B Allen
*Assistant Examiner* — Adam W Booher
(74) *Attorney, Agent, or Firm* — Clifton E. Richardson; Theresa Stadheim

(57) ABSTRACT

A multilayer optical film includes a plurality of optical repeat units which may number less than about 175 in total and which may have a combined average thickness of less than about 20 micrometers. Each of the optical repeat units includes at least four individual layers which may include at least one polymeric A layer, at least two B layers, and at least one polymeric C layer. At least one layer in the at least four individual layers can have an average thickness of less than about 50 nm. An interlayer adhesion of the individual layers in the plurality of optical repeat units can be at least about (Continued)

14 grams per inch when measured at a 90 degree peel angle. The multilayer optical film may be a reflective polarizer or a multilayer optical mirror.

20 Claims, 20 Drawing Sheets

(58) Field of Classification Search
CPC ...... G02B 5/3033; G02B 5/3041; G02B 5/28; G02B 5/285; G02B 5/286; G02B 5/288
See application file for complete search history.

(56) References Cited

U.S. PATENT DOCUMENTS

| | | | |
|---|---|---|---|
| 5,540,978 A | 7/1996 | Schrenk | |
| 5,783,120 A | 7/1998 | Ouderkirk et al. | |
| 5,882,774 A | 3/1999 | Jonza et al. | |
| 6,045,894 A | 4/2000 | Jonza et al. | |
| 6,157,490 A * | 12/2000 | Wheatley | G02B 5/287 359/590 |
| 6,179,948 B1 | 1/2001 | Merrill et al. | |
| 6,207,260 B1 | 3/2001 | Wheatley et al. | |
| 6,590,707 B1 | 7/2003 | Weber | |
| 6,667,095 B2 | 12/2003 | Wheatley et al. | |
| 6,696,142 B2 | 2/2004 | Baer et al. | |
| 6,783,349 B2 | 8/2004 | Neavin et al. | |
| 6,967,778 B1 | 11/2005 | Wheatley et al. | |
| 9,069,136 B2 | 6/2015 | Weber et al. | |
| 9,162,406 B2 | 10/2015 | Neavin et al. | |
| 10,001,587 B2 | 6/2018 | Liu | |
| 2004/0004778 A1 | 1/2004 | Liu | |
| 2007/0298271 A1 | 12/2007 | Liu et al. | |
| 2010/0124667 A1 | 5/2010 | Liu et al. | |
| 2011/0222295 A1* | 9/2011 | Weber | B32B 7/023 362/296.01 |
| 2011/0279997 A1* | 11/2011 | Weber | G02B 6/0056 359/485.02 |
| 2012/0206674 A1 | 8/2012 | Weber et al. | |
| 2015/0378077 A1 | 12/2015 | Haag et al. | |
| 2019/0111666 A1 | 4/2019 | Hebrink et al. | |
| 2019/0369314 A1 | 12/2019 | Hebrink et al. | |

FOREIGN PATENT DOCUMENTS

| | | |
|---|---|---|
| WO | 2013001269 A1 | 1/2013 |
| WO | 2013059226 A1 | 4/2013 |
| WO | 2020183260 A1 | 9/2020 |
| WO | 2020234808 A1 | 11/2020 |

* cited by examiner

MULTILAYER OPTICAL FILM

CROSS REFERENCE TO RELATED APPLICATIONS

This application is a national stage filing under 35 U.S.C. 371 of PCT/IB2022/051435, filed Feb. 17, 2022, which claims the benefit of U.S. Application No. 63/161,046, filed Mar. 15, 2021, the disclosures of which are incorporated by reference in their entirety herein.

BACKGROUND

A multilayer optical film can include a stack of polymeric layers arranged into optical repeat units. The multilayer optical film can be a reflective polarizer or a mirror.

SUMMARY

The present description relates generally to multilayer optical films. The optical film can include a plurality of optical repeat units, where each optical repeat unit includes at least four individual layers. The optical repeat units may be configured such that the optical film has a desired reflection strength with a low total thickness (e.g., less than about 24 micrometers or less than about 20 micrometers) and/or has a high interlayer adhesion (e.g., at least about 14 grams per inch or at least about 20 grams per inch, when measured at a 90 degree peel angle). The multilayer optical film can be a reflective polarizer or an optical mirror, for example.

In some aspects of the present description, a reflective polarizer including a plurality of optical repeat units disposed between first and second skin layers is provided. Each optical repeat unit can include at least one polymeric A layer, at least two B layers, and at least one polymeric C layer, where each pair of adjacent A and C layers have at least one of the two B layers disposed therebetween. A total number of the A and C layers in the plurality of optical repeat units disposed between the first and second skin layers can be less than about 400. Each of the A and C layers can have an average thickness of between about 50 nm and about 500 nm, and each of the B layers can have an average thickness of less than about 50 nm. Each of the first and second skin layers have an average thickness of greater than about 500 nm. The reflective polarizer can have an average thickness of less than about 20 micrometers. The reflective polarizer can be such that for a light incident on the reflective polarizer in an incident plane, for each of a first incident angle less than about 5 degrees and a second incident angle greater than about 40 degrees, and for a visible wavelength range extending from about 420 nm to about 680 nm, the plurality of optical repeat units has an average optical transmittance of: less than about 10% for an s-polarization state when an in-plane first direction of the reflective polarizer lies in the incident plane; and greater than about 65% for a p-polarization state when an in-plane orthogonal second direction of the reflective polarizer lies in the incident plane.

In some aspects of the present description, a multilayer optical film including a plurality of optical repeat units is provided. The optical repeat units in the plurality of optical repeat units can number less than about 175 in total and can have a combined average thickness of less than about 20 micrometers. Each of the optical repeat units includes at least four individual layers. At least first and second individual layers in the at least four individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. For at least one wavelength in a visible wavelength range extending from about 420 nm to about 680 nm: nx1 can greater than at least one of ny1 and nz1 by at least 0.15; a magnitude of a maximum difference between nx2, ny2 and nz2 can be less than 0.15; and nx1 can be greater than nx2 by at least 0.15. At least a third layer in the at least four individual layers of each of the optical repeat units can have an average thickness of less than about 50 nm. An interlayer adhesion of the individual layers in the plurality of optical repeat units can be at least about 14 grams per inch when measured at a 90 degree peel angle.

In some aspects of the present description, a multilayer optical film including a plurality of optical repeat units is provided. The optical repeat units in the plurality of optical repeat units can number less than about 175 in total and can have a combined average thickness of less than about 20 micrometers. Each of the optical repeat units includes at least four individual layers. At least first and second individual layers in the at least four individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. For at least one wavelength in a visible wavelength range extending from about 420 nm to about 680 nm: nx1 can be greater than at least one of ny1 and nz1 by at least 0.15: nx2 can be less than at least one of ny2 and nz2: and nx1 can be greater than nx2 by at least 0.15. An interlayer adhesion of the individual layers in the plurality of optical repeat units can be at least about 14 grams per inch when measured at a 90 degree peel angle.

In some aspects of the present description, a multilayer optical film including a plurality of optical repeat units is provided. The optical repeat units in the plurality of optical repeat units can number less than about 175 in total and can have a combined average thickness of less than about 20 microns. Each of the optical repeat units includes at least four individual layers. At least first and second individual layers in the at least four individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. For at least one wavelength in a visible wavelength range extending from about 420 nm to about 680 nm: a magnitude of a maximum difference between nx1, ny1 and nz1 can be less than 0.05; nx2 can be less than at least one of ny2 and nz2: and nx1 can be greater than nx2 by at least 0.07. At least a third layer in the at least four individual layers of each of the optical repeat units can have an average thickness of less than about 50 nm. An interlayer adhesion of the individual layers in the plurality of optical repeat units can be at least about 14 grams per inch when measured at a 90 degree peel angle.

In some aspects of the present description, a multilayer optical mirror including a plurality of optical repeat units is provided. The optical repeat units in the plurality of optical repeat units can number less than about 200 in total and can have a combined average thickness of less than about 20 micrometers. Each of the optical repeat units includes at least four sequentially arranged first through fourth individual layers. The first and third individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. For at least one wavelength in a visible wavelength range extending from about 420 nm to about 680 nm: nx1 and ny1 can be greater than the respective nx2 and ny2 by at least 0.1, and nz2 can be greater than nz1 by at least 0.05. The multilayer optical mirror can be such that for a light incident on the multilayer optical mirror, for each of mutually orthogonal first and second polarization states, and for the visible wavelength range, the plurality of optical repeat units has an average optical transmittance T1 for a first incident angle less than about 5 degrees, and an average optical transmittance T2 for a second incident angle greater than about 40 degrees, where $T1/T2 \geq 1.2$.

These and other aspects will be apparent from the following detailed description. In no event, however, should this brief summary be construed to limit the claimable subject matter.

DETAILED DESCRIPTION

Figure 1A:
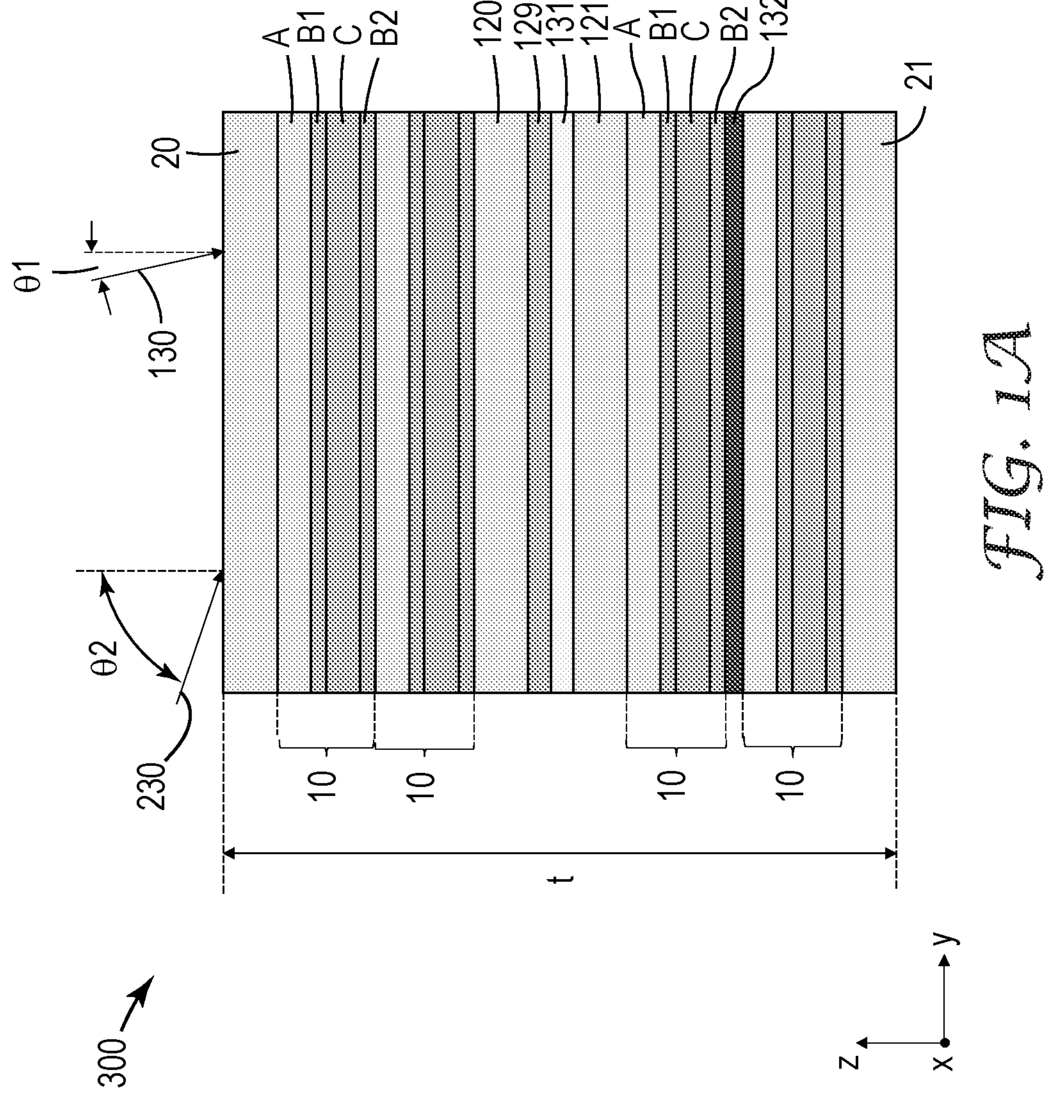
FIG. 1A is a schematic cross-sectional view of an optical film, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films including alternating polymeric layers can be used to provide desired reflection and transmission in desired wavelength ranges by suitable selection of layer thicknesses and refractive index differences as generally described in U.S. Pat. No. 5,882,774 (Jonza et al.): U.S. Pat. No. 6,179,948 (Merrill et al.): U.S. Pat. No. 6,783,349 (Neavin et al.): U.S. Pat. No. 6,967,778 (Wheatley et al.); and U.S. Pat. No. 9,162,406 (Neavin et al.), for example. The alternating polymeric layers typically include alternating high and low index layers which can be described as optical layers that transmit and reflect light primarily by optical interference. A multilayer optical film including alternating high and low index layers can be described as including a plurality of optical repeat units where each optical repeat unit includes a high index layer and a low index layer. An optical repeat unit is generally the smallest distinct unit of optical layers that repeats along a thickness direction of the optical film. Each optical repeat unit may include one or more layers in addition to the high and low index layers as described in U.S. Pat. No. 5,103,337 (Schrenk et al.); U.S. Pat. No. 5,540,978 (Schrenk) and U.S. Pat. No. 6,207,260 (Wheatley et al.), for example. The high index layers are often chosen to be a positively birefringent material so that when the cast film is stretched, the refractive index of the high index layers increases in the stretch direction. Increasing the difference in refractive indices between the high and low index layers can result in a strong reflection and thereby reduce the total number of layers and the resulting film thickness needed to achieve a desired reflection strength. The difference in refractive index can be increased by choosing a negatively birefringent material for the low index layers as well as a positively birefringent material for the high index layers so that the refractive index of the low index layers decreases and the refractive index of the high index layers increases in the stretch direction. For example, polyethylene naphthalate (PEN) is a suitable positively birefringent material and syndiotactic polystyrene (sPS) is a suitable negatively birefringent material. However, it has been found that the bonding between PEN and sPS is low when these materials are coextruded and/or stretched with one another and this results in interlayer adhesion in a multilayer optical film formed from alternating PEN and sPS layers that is too low for many applications (e.g., delamination or partial delamination of the layers may result when handling or shaping or applying the optical film to a device or other optical element and this can degrade the performance of the optical film).

According to some embodiments, a high reflectance (e.g., greater than about 90%), or a correspondingly low transmittance (e.g., less than about 10%), is achieved for at least one polarization state with a polymeric multilayer optical film having a low total average thickness (e.g., less than about 20 micrometers) and/or a low total number of optical repeat units (e.g., less than about 200 optical repeat units or less than about 175 optical repeat units) while maintaining a suitable interlayer adhesion (e.g., at least about 14 grams per inch or at least about 20 grams per inch, when measured at a 90 degree peel angle). In some embodiments, the optical film also has improved transmission in a pass polarization state. In some embodiments, the pass state transmission is improved at high (e.g., greater than about 40 degree) angles of incidences. In some embodiments, the desired properties of the optical film are achieved by including positively birefringent high index layers, negatively birefringent low index layers, and an additional layer between each of the high and low index layers. The additional layer can be chosen to increase an interlayer adhesion between the layers of the optical film. In some embodiments, the additional layer is an isotropic polymeric layer. In some embodiments, desired properties of the optical film are achieved by using positively birefringent high index layers, substantially isotopic low index layers that would have poor bonding with the high index layers if bonded directly to the high index layers (e.g., low index layers that contain fluorine groups), and an additional layer between each of the high and low index layers to improve the interlayer adhesion. In some embodiments, desired properties of the optical film are achieved by using optical repeat units including substantially isotropic high index layers, negatively birefringent low index layers, and an additional layer between each of the high and low index layers. For example, such optical repeat units can be used to provide a collimating optical mirror as described further elsewhere herein.

Figure 1B:
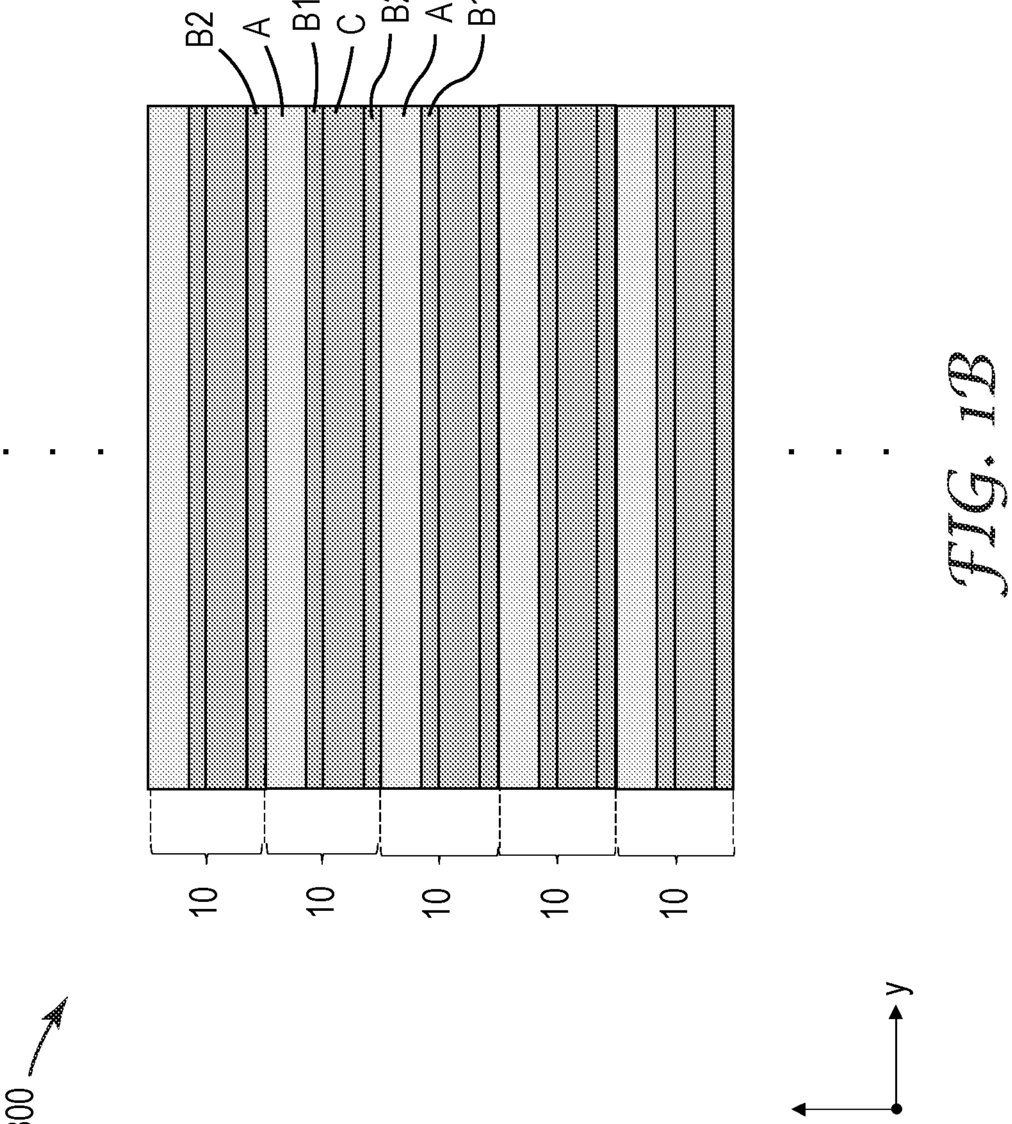
FIG. 1B is a schematic cross-sectional view of a portion of an optical film, according to some embodiments.

FIG. 1A is a schematic cross-sectional view of a multilayer optical film 300, according to some embodiments. The optical film 300 may be adapted to selectively reflect and transmit light based on wavelength and/or polarization state. The optical film 300 may be a reflective polarizer or an optical mirror, for example. The optical film 300 includes a plurality of optical repeat units 10 where each optical repeat unit 10 includes at least 4 individual layers. In the illustrated embodiment, the at least 4 individual layers include an A layer, a B1 layer, a C layer, and a B2 layer. The optical film 300 may include many more optical repeat units 10 than schematically illustrated in FIG. 1A. FIG. 1B is a schematic cross-sectional view of a portion of a multilayer optical film 300, according to some embodiments, indicating a larger number of optical repeat units 10.

In some embodiments, a multilayer optical film 300 includes a plurality of optical repeat units 10 disposed between first 20 and second 21 skin layers where each optical repeat unit includes at least one polymeric A layer, at least two B layers (e.g., at least a B1 layer and a B2 layer), and at least one polymeric C layer. Each pair of adjacent A and C layers can have at least one of the two B layers disposed therebetween. A total number of the A and C layers in the plurality of optical repeat units disposed between the first and second skin layers 20 and 21 can be less than about 400. For example, the total number of the A and C layers can be in a range of about 10 or about 20 to about 400 or to about 350. The total number of optical repeat units in the plurality of optical repeat units refers to the total number of distinct optical repeat units (no layer of the film is in more than one distinct optical repeat unit). In some embodiments, a multilayer optical film 300 includes a plurality of optical repeat units where the optical repeat units in the plurality of optical repeat units number, for example, less than about 200, or less than about 175, or less than about 150, or less than about 130, or less than about 120, or less than about 115, or less than about 110, or less than about 105, or less than about 100, or less than about 95, or less than about 90 in total. The total number of optical repeat units in the plurality of optical repeat units can be at least about 10, or at least about 15, or at least about 20, or at least about 25, or at least about 30, or at least about 40, or at least about 50, or at least about 60, or at least about 70, or at least about 75, for example. The plurality of optical repeat units can have a combined average thickness of less than about 20 micrometers, or less than about 19 micrometers, or less than about 18 micrometers, or less than about 17 micrometers, or less than about 16 micrometers, or less than about 15 micrometers, for example. The combined average thickness of the optical repeat units can be greater than about 5 micrometers, or greater than about 8 micrometers, or greater than about 10 micrometers, for example.

In some embodiments, each optical repeat unit 10 is defined by four individual layers (e.g., A, B1, C, B2). In other words, in some embodiments, each optical repeat unit 10 includes only four individual layers. In other embodiments, each optical repeat unit 10 includes more than four individual layers.

Each of the A and C layers can have an average thickness of between about 50 nm and about 500 nm, or between about 75 nm and about 400 nm, or between about 100 nm and about 300 nm. An average thickness of a layer is the unweighted mean over the area of the layer of the thickness of the layer. In some embodiments, the B layers are used primarily to promote adhesion between the A and C layers and may be thin enough to not substantially affect the optical properties of the optical film. In some embodiments, the B layers may promote adhesion between the A and C layers and may also substantially affect the optical properties of the optical film. In some embodiments, each of the B layers has an average thickness of less than about 50 nm, or less than about 40 nm, or less than about 30 nm, or less than about 20 nm, or less than about 15 nm, or less than about 10 nm, or less than about 7.5 nm. In some such embodiments, or in other embodiments, each of the B layers has an average thickness of at least about 0.5 nm, or at least about 1 nm, or at least about 2 nm, or at least about 3 nm. For example, in some embodiments, each of the B layers has an average thickness in a range of about 1 nm to about 30 nm, or about 3 nm to about 20 nm. In some embodiments, for each of the optical repeat units 10, an average thickness of each of the B layers (e.g., the B1 and B2 layers) is less than an average thickness of each of the A and C layers by at least a factor of 2, or at least a factor of about 2.25, or at least a factor of about 2.5, or at least a factor of about 2.75, or at least a factor of about 3, or at least a factor of about 3.25. In some such embodiments, or in other embodiments, for each of the optical repeat units 10, an average thickness of each of the B layers (e.g., the B1 and B2 layers) is less than an average thickness of each of the A and C layers by at least a factor of up to about 100, or up to about 50, or up to about 40, for example. In some embodiments, each of the B layers is a polymeric layer.

In some embodiments, each of the first and second skin layers 20 and 21 has an average thickness of greater than about 500 nm, or greater than about 750 nm, or greater than about 1000 nm, or greater than about 1250 nm, or greater than about 1500 nm. In some such embodiments, or in other embodiments, each of the first and second skin layers 20 and 21 has an average thickness less than about 8 micrometers, or less than about 5 micrometers, or less than about 4 micrometers. The optical film 300 may include additional layers, such as protective boundary layers 120, 121 that are used to protect packets of optical repeat units as is known in the art, or such as additional layers 129, 131 disposed between protective boundary layers 120, 121 or additional layer(s) 132 between optical repeat units. The additional layers 129, 131, 132, if included, can each have an average thickness of less than about 500 nm or the average thickness can be in any range described for any of the A, B1, B2, or C layers. The protective boundary layers 120, 121, if included, can each have an average thickness in a range of about 500 nm or about 750 nm to about 2 micrometers, for example. In some embodiments, the optical film 300 has an average thickness t of less than about 24 micrometers, or less than about 22 micrometers, or less than about 20 micrometers, or less than about 19 micrometers, or less than about 18 micrometers, or less than about 17 micrometers, or less than about 16 micrometers, or less than about 15 micrometers. In some such embodiments, or in other embodiments, the average thickness t is greater than about 5 micrometers, or greater than about 8 micrometers, or greater than about 10 micrometers, for example. The average thickness t may be described as the combined average thickness of the optical repeat units plus the average thickness of the skin layers 20, 21 plus the average thickness of any additional layers (e.g., 120, 121, 129, 131, 132) that may be included.

In some embodiments, each of the B layers (e.g., the B1 and B2 layers) has a same composition. In other embodiments, the B1 and B2 layers have a different composition. In some embodiments, for each optical repeat unit in the optical film 300 or for each optical repeat unit in at least a majority of the optical repeat units of the optical film 300, the B1 and B2 layers in the optical repeat unit have a substantially same thickness (e.g., the layers can have a thickness within 10% of each other or within 5% of each other). In some embodiments, each B1 and B2 layer in the optical film 300, or each B1 and B2 layer in at least a majority of the optical repeat units of the optical film 300, has a substantially same thickness. In some embodiments, the B1 and B2 layers have an average thickness that generally increases from one side of the optical film 300 to the opposite side of the optical film 300. In some embodiments, for each optical repeat unit in the optical film 300 or for each optical repeat unit in at least a majority of the optical repeat units of the optical film 300, the B1 and B2 layers in the optical repeat unit have different thicknesses. In some embodiments, for each optical repeat unit in the optical film 300 or for each optical repeat unit in at least a majority of the optical repeat units of the optical film 300, the A and C layers have a same composition and have substantially different thicknesses (e.g., thickness differ by greater than 10%). In some embodiments, the A and C layers have different compositions.

In some embodiments, the optical film 300 is integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film having each of the layers, and then orienting the cast film) rather than manufactured separately and then subsequently joined.

Figure 2B:
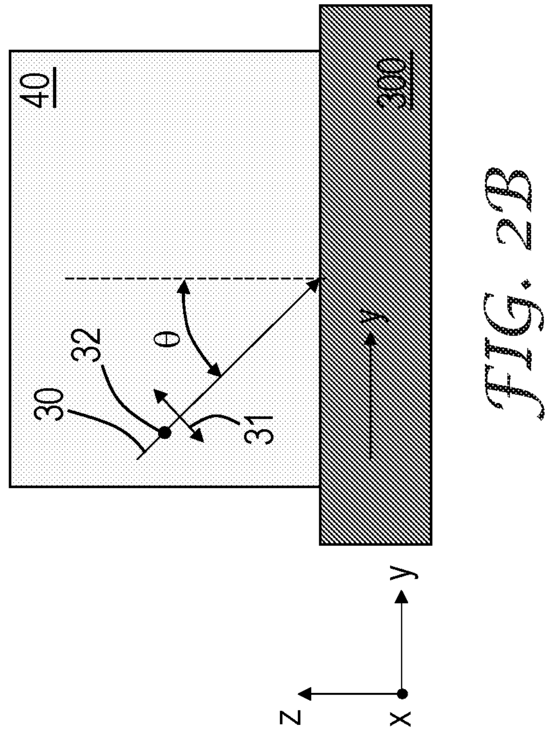
FIGS. 2A-2B are schematic cross-sectional views of light incident on an optical film in different incident planes.
Figure 2A:
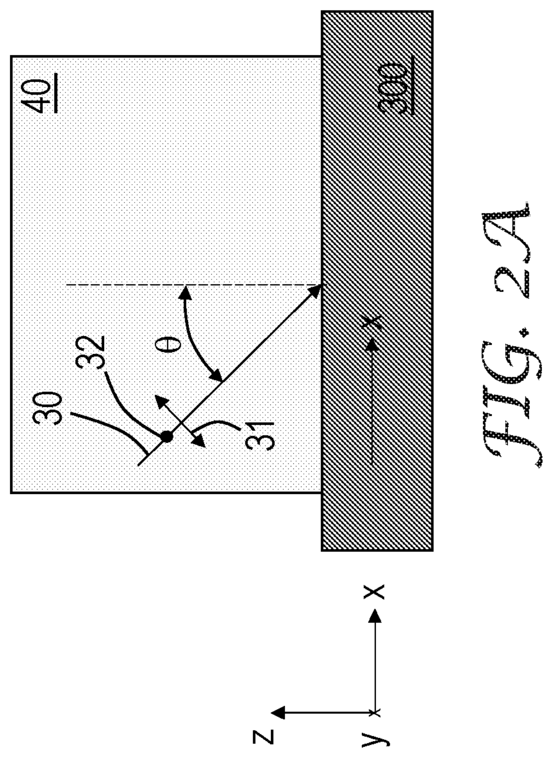

Light 130 and light 230 incident on the optical film 300 at respective angles of incidence θ1 and θ2 are schematically illustrated in FIG. 1A. An incident angle is an angle of a direction of light incident on a surface relative to a normal to the surface and is in a range of 0 degrees to 90 degrees. FIGS. 2A-2B schematically illustrate light 30, which may correspond to light 130 or light 230, incident on the optical film 300 at an angle of incidence θ. In FIG. 2A, an in-plane first direction (x-direction) of the optical film 300 lies in the incident plane 40 (plane defined by the direction of incident light and the surface normal). In FIG. 2B, an in-plane second direction (y-direction) of the optical film 300 lies in the incident plane 40. The in-plane second direction is orthogonal to the in-plane first direction. The first direction may correspond to a block axis of a reflective polarizer and the second direction may correspond to a pass axis of the reflective polarizer, for example. A p-polarization state 31 (electric field in the incident plane) and an s-polarization state 32 (electric field orthogonal to the incident plane) are illustrated.

In some embodiments, the optical film 300 is a reflective polarizer such that for a light 30 incident on the reflective polarizer in an incident plane 40, for each of a first incident angle θ1 less than about 5 degrees and a second incident angle θ2 greater than about 40 degrees, and for a visible wavelength range extending from about 420 nm to about 680 nm, the plurality of optical repeat units 10 has an average optical transmittance of less than about 10% for an s-polarization state 32 when an in-plane first direction (x-direction) of the reflective polarizer lies in the incident plane 40, and greater than about 65% for a p-polarization state 31 when an in-plane orthogonal second direction (y-direction) of the reflective polarizer lies in the incident plane 40. The first incident angle θ1 can be, for example, less than about 4 degrees, or less than about 3 degrees, or less than about 2 degrees. For example, the first incident angle θ1 can be about zero degrees. The second incident angle θ2 can be greater than about 45 degrees or greater than about 50 degrees or greater than about 55 degrees. For example, the second incident angle can be about 60 degrees. In some embodiments, for each of the first and second incident angles θ1 and θ2 and for the visible wavelength range, the plurality of optical repeat units 10 has an average optical transmittance of less than about 10%, or less than about 8%, or less than about 6%, or less than about 4%, or less than about 2% for the s-polarization state 32 when the in-plane first direction of the reflective polarizer lies in the incident plane 40. In some such embodiments, or in other embodiments, for each of the first and second incident angles θ1 and θ2 and for the visible wavelength range, the plurality of optical repeat units 10 has an average optical transmittance of greater than about 65%, or greater than about 70%, or greater than about 75%, or greater than about 80%, or greater than about 85% for the p-polarization state 31 when the in-plane second direction of the reflective polarizer lies in the incident plane 40.

The transmittance of a plurality of optical repeat units of an optical film that includes outermost skin layers, for example, may be determined by measuring the transmittance of the optical film, measuring the refractive indices of the outermost skin layers of the optical film, using the measured refractive indices in the Fresnel equations to determine the reflection from the outermost major surfaces, and then calculating the transmittance of the plurality of optical repeat units from the measured transmittance and the reflections from the outermost major surfaces. This neglects the typically small additional Fresnel reflections at interfaces between the plurality of optical repeat units and any other layers of the optical film. Any such additional Fresnel reflections may be accounted for by determining the refractive indices of the layers adjacent these interfaces and using the Fresnel equations to make the appropriate correction. Alternatively, the transmittance of the plurality of optical repeat units can be determined from conventional optical modeling calculations by determining the material properties of the individual layers and measuring the thicknesses of individual layers of the optical film using atomic force microscopy (AFM), for example. In some embodiments, the optical film 300 has optical transmittances in any range described for the plurality of optical repeat units for the s- and/or p-polarization states and for the in-plane first direction and/or the in-plane second direction of the reflective polarizer lying in the incident plane 40.

In some embodiments, the plurality of optical repeat units has an optical transmittance for the s-polarization state 32 when the in-plane first direction of the reflective polarizer lies in the incident plane 40 in any of the ranges described for the p-polarization state 31 when the in-plane first direction of the reflective polarizer lies in the incident plane 40. In some embodiments, the plurality of optical repeat units has an optical transmittance for the p-polarization state 31 when the in-plane second direction of the reflective polarizer lies in the incident plane 40 in any of the ranges described for the s-polarization state 32 when the in-plane second direction of the reflective polarizer lies in the incident plane 40. In some embodiments, the optical film 300 is a reflective polarizer such that for a p-polarized light incident on the reflective polarizer in an incident plane 40, for each of a first incident angle θ1 less than about 5 degrees and a second incident angle θ2 greater than about 40 degrees, and for a visible wavelength range extending from about 420 nm to about 680 nm, the plurality of optical repeat units 10 has an average optical transmittance of less than about 10% when an in-plane first direction (x-direction) of the reflective polarizer lies in the incident plane 40, and greater than about 65% when an in-plane orthogonal second direction (y-direction) of the reflective polarizer lies in the incident plane 40.

Suitable materials for the various layers in the multilayer optical film 300 include, for example, polyethylene naphthalate (PEN), coPEN (copolyethylene naphthalate terephthalate copolymer), polyethylene terephthalate (PET), polyhexylethylene naphthalate copolymer (PHEN), glycol-modified PET (PETG), glycol-modified PEN (PENG), syndiotactic polystyrene (sPS). THV (a terpolymer of tetrafluoroethylene, hexafluoropropylene and vinylidene fluoride), polymethyl methacry late (PMMA), coPMMA (a copolymer of methyl methacrylate and ethyl acrylate), styrenic block copolymers (block copolymers including styrene blocks) such as linear triblock copolymers based on styrene and ethylene/butylene, acrylic block copolymers (block copolymers including acrylate or methacrylate blocks) such as a linear triblock copolymers based on methyl methacrylate and n-butyl acrylate, anhydride-modified ethylene vinyl acetate polymers, ketone ethylene ester terpolymers, polyolefin thermoplastic elastomer, or blends thereof. For example, in some embodiments, each A layer comprises polyethylene naphthalate, polyethylene terephthalate, or polyhexylethylene naphthalate copolymer: and each C layer comprises syndiotactic polystyrene; a terpolymer of tetrafluoroethylene, hexafluoropropylene and vinylidene fluoride; polymethylmethacry late: a copolymer of methyl methacry late and ethyl acrylate: or copolyethylene naphthalate terephthalate copolymer. In some embodiments, each B layer comprises styrenic block copolymer, acrylic block copolymer, glycol-modified polyethylene terephthalate, glycol-modified polyethylene naphthalate, polymethylmethacrylate, a copolymer of methyl methacry late and ethyl acry late, anhydride-modified ethylene vinyl acetate polymer, ketone ethylene ester terpolymer, polyolefin thermoplastic elastomer or copolyethylene naphthalate terephthalate copolymer, where each B layer has a different composition than each A and C layer. In some embodiments, each A layer comprises polyethylene naphthalate, polyethylene terephthalate, or polyhexylethylene naphthalate copolymer: each B layer comprises styrenic block copolymer, acrylic block copolymer, glycol-modified polyethylene terephthalate, glycol-modified polyethylene naphthalate, anhydride-modified ethylene vinyl acetate polymer, or ketone ethylene ester terpolymer, and each C layer comprises syndiotactic polystyrene: a terpolymer of tetrafluoroethylene, hexafluoropropylene and vinylidene fluoride: polymethylmethacry late: a copolymer of methyl methacry late and ethyl acrylate: or a copolyethylene naphthalate terephthalate copolymer. In some embodiments, each polymeric A layer comprises polyethylene naphthalate, polyethylene terephthalate, or polyhexylethylene naphthalate copolymer: each B layer comprises polymethylmethacrylate or a copolymer of methyl methacrylate and ethyl acrylate: and each polymeric C layer comprises syndiotactic polystyrene: a terpolymer of tetrafluoroethylene, hexafluoropropylene and vinylidene fluoride: or a copolyethylene naphthalate terephthalate copolymer.

In some embodiments where each C layer comprises syndiotactic polystyrene (sPS), each B layer may comprise styrenic block copolymer, acrylic block copolymer, glycol-modified polyethylene terephthalate, or glycol-modified polyethylene naphthalate, for example. In some embodiments where each A layer comprises a polyester (e.g., PET, PEN, or PHEN), each B layer may comprise styrenic block copolymer, for example. Styrenic block copolymers have been found to be particularly useful in providing a high bond strength with polyesters (e.g., PET, PEN, or PHEN) and/or with sPS. In some embodiments where each C layer comprises a terpolymer of tetrafluoroethylene, hexafluoropropylene and vinylidene fluoride (THV), each B layer may comprise polymethylmethacry late (PMMA) or a copolymer of methyl methacry late and ethyl acrylate (coPMMA), for example. Acrylates (e.g., PMMA or coPMMA or acrylic block copolymer or blends thereof) have been found be particularly useful in providing a high bond strength with fluoropolymers (e.g., THV). As one example, the A layers may comprise PEN, the C layers may comprise THV, and the B layers may comprise PMMA. As another example, the A layers may comprise PET, the C layers may comprise THV, and the B layers may comprise coPMMA. Interlayer adhesion between fluoropolymers (e.g., THV) and acry lates or other materials is described in U.S. Pat. Appl. Pub. Nos. 2019/0369314 (Hebrink et al.) and 2019/0111666 (Hebrink et al.), for example. In some examples, an interlayer adhesion between PEN and PMMA was about 30 grams per inch when measured at a 90 degree peel angle which is substantially higher than an interlayer adhesion between many fluoropolymers and PEN. In some examples, an interlayer adhesion between PET and coPMMA was about 50 grams per inch when measured at a 90 degree peel angle which is substantially higher than an interlayer adhesion between many fluoropolymers and PET.

In some embodiments, each optical repeat unit 10 includes at least one fluoropolymer layer (e.g., one or more THV layers). In some embodiments, at least one layer of each optical repeat unit has a refractive index in at least one direction of no more than 1.4 at a wavelength of 633 nm. In some embodiments, at least one layer of each optical repeat unit has a refractive index of no more than 1.4 at a wavelength of 633 nm in each of three mutually orthogonal directions. In other embodiments, the optical repeat unit 10 does not include a fluoropolymer layer. In some embodiments, each layer of each optical repeat unit has a refractive index in at least one direction of at least 1.45 at a wavelength of 633 nm. In some embodiments, each layer of each optical repeat unit has a refractive index of at least 1.45 at a wavelength of 633 nm in each of three mutually orthogonal directions.

According to some embodiments. B layers formed from a polymer having a low glass transition temperature, or a block copolymer containing a (e.g., soft) polymeric block with a low glass transition temperature, or blends thereof have been found to provide improved bonding with A and C layers described herein. For example, the B layers can be formed from styrenic block copolymer, acrylic block copolymer. PMMA, or coPMMA or blends of any of the latter three. The glass transition temperature (of the B layers or of the soft blocks of the B layers) can be less than 105° C., or less than 100° C., or less than 90° C., or less than 80° C., or less than 70° C., or less than 60° C., or less than 50° C., or less than 40° C., or less than 30° C., or less than 20° C., or less than 10° C., or less than 0) ° C., or less than −10° C., or less than −20° C., or less than −30° C., or less than −40° C., or less than −50° C., for example. The glass transition temperature of a polymeric block of a copolymer can be determined as the glass transition temperature of a homopolymer of the monomeric units of the polymeric block. The block copolymer may also include other (e.g., hard) blocks for mechanical properties (e.g., for material handling and/or low creep), for example A (e.g., hard) block for mechanical properties can have a glass transition temperature greater than 50° C., or greater than 60° C., or greater than 70° C., or greater than 80° C., or greater than 90° C. or greater than 100° C., or greater than 105° C., for example. In some embodiments, each B layer is a chemically inert, or substantially chemically inert, polymeric layer. That is, in some embodiments, the polymer of the B layers does not create covalent bonds with the material of the A layer or with the material of the C layers, or creates so few covalent bonds as to negligibly affect the bonding with either of the adjacent layers.

Atactic polystyrene (aPS) can optionally be blended with sPS (e.g., at about 5 to about 30 weight percent aPS) to adjust the refractive indices of the resulting layer and/or to reduce the haze of the layer (e.g., by reducing a crystallinity of the layer). Suitable THV polymers are described in U.S. Pat. Appl. Pub. No. 2019/0369314 (Hebrink et al.), for example, and include those available under the DYNEON THV tradename from 3M Company (St. Paul, MN). In some embodiments. THV can contain about 35 to about 75 mole percent tetrafluoroethylene, about 5 to about 20 mole percent hexafluoropropylene, and about 15 to about 55 mole percent vinylidene fluoride. Suitable styrenic block copolymers include KRATON G1645 and KRATON G1657 available from KRATON Polymers (Houston, TX). Suitable acrylic block copolymers include those available under the KURARITY tradename from Kuraray Co., Ltd. (Tokyo. JP). PETG can be described as PET with some of the glycol units of the polymer replaced with different monomer units, typically those derived from cyclohexanedimethanol. PETG can be made by replacing a portion of the ethylene glycol used in the transesterification reaction producing the polyester with cyclohexanedimethanol, for example. Suitable PETG copolyesters include GN071 available from Eastman Chemical Company (Kingsport. TN). PEN and coPEN can be made as described in U.S. Pat. No. 10,001,587 (Liu), for example. Low melt PEN is a coPEN including about 90 mole percent naphthalene dicarboxylate groups based on total carboxylate groups and is also known as coPEN 90/10. Another useful coPEN is coPEN 70/30 which includes about 70 mole percent naphthalene dicarboxylate groups and about 30 mole percent terephthalate dicarboxylate groups based on total carboxylate groups. More generally, coPEN Z/100-Z may be used where coPEN Z/100-Z includes Z mole percent naphthalene dicarboxylate groups (typically greater than 50 mole percent and no more than about 90 mole percent) and 100-Z mole percent terephthalate dicarboxylate groups based on total carboxy late groups. Glycol-modified polyethylene naphthalate (PENG) can be described as PEN with some of the glycol units of the polymer replaced with different monomer units and can be made by replacing a portion of the ethylene glycol used in the transesterification reaction producing the polyester with cyclohexanedimethanol, for example PHEN can be made as described for PEN in U.S. Pat. No. 10,001,587 (Liu), for example, except that a portion of the ethylene glycol (e.g., about 40 mole percent) used in the transesterification reaction is replaced with hexanediol. Suitable PET can be obtained from Nan Ya Plastics Corporation. America (Lake City. SC), for example. Suitable sPS can be obtained from Idemitsu Kosan Co., Ltd. (Tokyo, Japan), for example. Suitable PMMA can be obtained from Arkema Inc., Philadelphia. PA., for example. Suitable anhydride-modified ethylene vinyl acetate polymers include those available from Dow Chemical (Midland. MI) under the BYNEL tradename, for example. Suitable ketone ethylene ester terpolymers include those available from Dow Chemical (Midland. MI) under the BYNEL tradename, for example. Suitable polyolefin thermoplastic elastomers include those available from Mitsui Chemicals (Tokyo, Japan) under the ADMER tradename.

PEN. PET, and PHEN are examples of positively birefringent thermoplastic polymers, while sPS is an example of a negatively birefringent thermoplastic polymer. As described in U.S. Pat. No. 9,069,136 (Weber et al.), for example, whether a polymer will exhibit positive or negative birefringence can depend on the geometry of crystallites formed when the polymer is oriented. Suitable positively birefringent thermoplastic polymers include those forming crystallites having a symmetry axis substantially aligned with a stretch direction, while suitable negatively birefringent thermoplastic polymers include those forming crystallites having discotic unit cell structure with the smallest unit cell dimension substantially aligned with a stretch direction. Styrenic block copolymers. PMMA, coPMMA. THV, acrylic block copolymer, coPEN, and PETG are examples of thermoplastic polymers that can be substantially isotropic after orientation. Substantially isotropic polymers typically either substantially do not form crystallites when oriented or form crystallites that are melted out when a film containing the polymer is heat set. Further examples of positively and negatively birefringent thermoplastic polymers and of isotropic thermoplastic polymers, are described in U.S. Pat. No. 9,069,136 (Weber et al.), for example. Other suitable materials for the various layers in the multilayer optical film 300 include those described in U.S. Pat. No. 5,103,337 (Schrenk et al.), U.S. Pat. No. 5,540,978 (Schrenk); U.S. Pat. No. 5,882,774 (Jonza et al.); U.S. Pat. No. 6,179,948 (Merrill et al.); U.S. Pat. No. 6,207,260 (Wheatley et al.); U.S. Pat. No. 6,783,349 (Neavin et al.); U.S. Pat. No. 6,967,778 (Wheatley et al.); U.S. Pat. No. 9,069,136 (Weber et al.); and U.S. Pat. No. 9,162,406 (Neavin et al.), for example.

Figure 3:
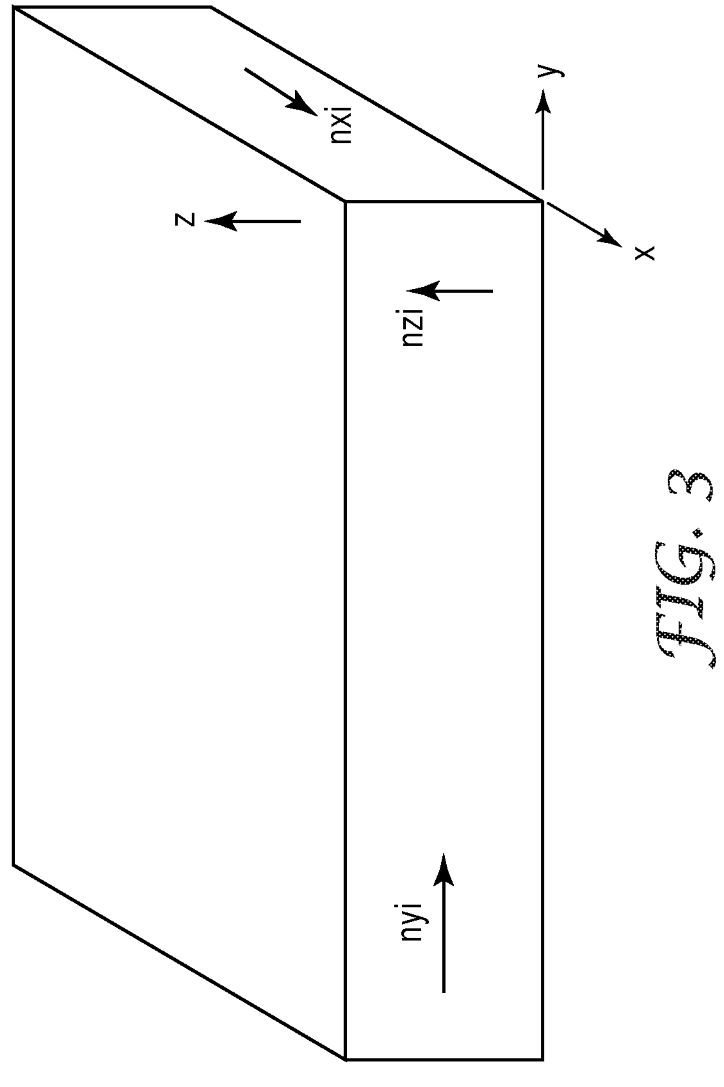
FIG. 3 is a schematic perspective view of an illustrative layer of an optical film.

Various layers of the optical film 300 may be characterized by their indices of refraction in a first in-plane direction (e.g., x-direction), an orthogonal second in-plane direction (e.g., y-direction) and/or along a thickness direction (z-direction) orthogonal to the in-plane directions. In embodiments where indices of refraction for multiple layers are specified, the indices of refraction along the x-, y-, and z-directions may be denoted nx1, ny1, nz1, respectively, with "i" being 1, 2, etc. FIG. 3 is a schematic perspective view of a layer of a multilayer optical film. Indices of refraction nx1, ny1, nz1 along x-, y-, and z-directions are indicated for a layer "i" which may correspond, for example, to any of layers A, B1, C, B2 illustrated in FIGS. 1A-1B. For example, in some embodiments, a multilayer optical film 300 includes a plurality of optical repeat units 10 where each of the optical repeat units includes at least four individual layers (e.g., A, B1, C, B2) and where at least first (e.g., one of A and C) and second (e.g., the other of A and C) individual layers in the at least four individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions.

The following table lists refractive indices at a wavelength of about 633 nm for various exemplary materials that may be used for layers of the optical film 300, according to some embodiments. Birefringent materials are typically uniaxially oriented for reflective polarizers and biaxially oriented for optical mirrors. Materials such as styrenic block copolymer, THV, PMMA, coPMMA, acrylic block copolymer, coPEN, and PETG are typically isotropic regardless of whether other layers in the multilayer optical film are biaxially or uniaxially oriented. For example, a multilayer optical film including layers of such materials can be heat set at a temperature above the glass transition temperature of the material used in these layers to result in isotropic layers. Layers of some materials (e.g., PHEN) may be uniaxially oriented, biaxially oriented, or isotropic depending on stretch conditions and heat set temperature. For example, PHEN layers may be biaxially or uniaxially oriented, or PHEN layers may be heat set above the glass transition temperature of PHEN to result in isotropic layers even after the layers have been uniaxially or biaxially stretched.

| Material | Orientation | nx | ny | nz |
|---|---|---|---|---|
| PEN | Uniaxial | 1.85 | 1.60 | 1.50 |
| PEN | Biaxial | 1.7661 | 1.7379 | 1.4917 |
| sPS | Uniaxial | 1.51 | 1.62 | 1.62 |
| sPS | Biaxial | 1.57 | 1.57 | 1.62 |
| PET | Uniaxial | 1.68 | 1.58 | 1.51 |
| PET | Biaxial | 1.6720 | 1.6466 | 1.4927 |
| PET | Isotropic | 1.574 | 1.574 | 1.574 |
| PHEN | Uniaxial | 1.83 | 1.59 | 1.51 |
| PHEN | Biaxial | 1.71 | 1.71 | 1.51 |
| PHEN | Isotropic | 1.62 | 1.62 | 1.62 |
| Styrenic Block Copolymer | Isotropic | 1.49 | 1.49 | 1.49 |
| THV | Isotropic | 1.36 | 1.36 | 1.36 |
| PMMA | Isotropic | 1.49 | 1.49 | 1.49 |
| coPMMA | Isotropic | 1.49 | 1.49 | 1.49 |
| Acrylic Block Copolymer | Isotropic | 1.48 | 1.48 | 1.48 |
| coPEN | Isotropic | 1.60 | 1.60 | 1.60 |
| PETG | Isotropic | 1.56 | 1.56 | 1.56 |

In some embodiments, each individual layer of each optical repeat unit has a refractive index in each of the x-, y-, and z-directions for at least one wavelength in a visible wavelength range extending from about 420 nm to about 680 nm in a range of about 1.3 to about 1.9. In some embodiments, each individual layer of each optical repeat unit has a maximum difference in refractive index for any two of the x-, y-, and z-directions for the at least one wavelength in a visible wavelength range extending from about 420 nm to about 680 nm of less than about 0.4, or less than about 0.36. In some embodiments, a maximum difference in refractive index of the individual layers in an optical repeat unit along each of the x-, y-, and z-directions for the at least one wavelength is less than about 0.55, or less than about 0.5, or less than about 0.45. In some embodiments, a maximum difference in refractive index of the individual layers in an optical repeat unit along a same direction (e.g., one of the x-, y-, and z-directions) for the at least one wavelength is greater than about 0.05, or greater than about 0.07, or greater than about 0.1, or greater than about 0.15, or greater than about 0.2, or greater than about 0.22, or greater than about 0.25. In some embodiments, when a difference in refractive indices (e.g., a difference in refractive indices of a same layer in different directions or a difference in refractive indices along a same direction for different layers) is said to be greater than a specified value for the at least one wavelength, the difference may be up to about 0.55, or up to about 0.5, or up to about 0.45, or up to about 0.4, or up to about 0.35, or up to about 0.3, for example.

In some embodiments, each optical repeat unit includes at least four individual layers including a more birefringent first individual layer (e.g., one of the A and C layers) and a less birefringent second individual layer (e.g., the other of the A and C layers). For example, in some embodiments, the first individual layer comprises polyethylene naphthalate (PEN) or polyhexylethylene naphthalate copolymer (PHEN): and the second individual layer comprises syndiotactic polystyrene (sPS), polymethylmethacry late (PMMA), a copolymer of methyl 10 methacrylate and ethyl acrylate (coPMMA), a copolyethylene naphthalate terephthalate copolymer (coPEN), or a terpolymer of tetrafluoroethylene, hexafluoropropylene and vinylidene fluoride (THV). As another example, in some embodiments, the first individual layer comprises polyethylene terephthalate (PET) and the at least the second individual layer comprises a terpolymer of tetrafluoroethylene, hexafluoropropylene and vinylidene fluoride (THV). The at least four individual layers can include at least a third layer that may include a styrenic block copolymer, an acrylic block copolymer, or a glycol-modified polyethylene terephthalate (PETG), for example. Any layer described as comprising a polymeric material may be a layer of that polymeric material. For example, a layer comprising PEN may be a PEN layer.

In some embodiments, for at least one wavelength in a visible wavelength range extending from about 420 nm to about 680 nm, nx1 is greater than at least one of ny1 and nz1 by at least 0.15: a magnitude of a maximum difference between nx2, ny2 and nz2 is less than 0.15: and nx1 is greater than nx2 by at least 0.15, or at least 0.17, or at least 0.2, or at least 0.22, or at least 0.25, or at least 0.28, or at least 0.3, or at least 0.32. In some such embodiments, or in other embodiments, for the at least one wavelength, nx1 is greater than nx2 by up to about 0.45, or up to about 0.4, or up to about 0.35, for example. In some embodiments, for the at least one wavelength, nx1 is greater than each of ny1 and nz1 by at least 0.15. In some embodiments, for the at least one wavelength nx1 is greater than one, but not the other, of ny1 and nz1 by at least 0.15. The maximum difference between three quantities is the largest of the three quantities minus the smallest of the three quantities. In some embodiments, nx2 is less than at least one of ny2 and nz2 (e.g., by at least 0.005, or by at least 0.01, or by at least 0.02, or by at least 0.03). In some embodiments, the magnitude of the maximum difference between nx2, ny2 and nz2 is less than 0.1, or less than 0.05, or less than 0.02. In some embodiments, for the at least one wavelength, nx1 is greater than at least one of ny1 and nz1 by at least 0.17, or at least 0.2, or at least 0.22, or at least 0.25. In some embodiments, for the at least one wavelength, nx1 is greater than at least one of ny1 and nz1 by up to about 0.45, or up to about 0.4, or up to 0.35, for example. For example, in some embodiments, the first individual layers are uniaxially oriented PEN layers having refractive indices nx1, ny1, nz1 at 633 nm of about 1.85, 1.60 and 1.50, respectively, and the second individual layers are uniaxially oriented sPS layers having refractive indices nx2, ny2, nz2 at 633 nm of about 1.51, 1.62, and 1.62, respectively. As another example, in some embodiments, the first individual layers are biaxially oriented PEN layers having refractive indices nx1, ny1, nz1 at 633 nm of about 1.76, 1.74, and 1.49, respectively, and the second individual layers are biaxially oriented sPS layers having refractive indices nx2, ny2, nz2 at 633 nm of about 1.57, 1.57, and 1.62, respectively. In some embodiments, at least the third layer (e.g., B1 and/or B2) has respective indices of refraction nx3, ny3 and nz3 along the respective x-, y- and z-directions, where for the at least one wavelength, nx2 is greater than nx3 by at least 0.005, or at least 0.01, or at least 0.02, or at least 0.05. For example, the first and second layers can be as described above, and the third layers can be styrenic block copolymer layers having refractive indices of about 1.49 in each direction at 633 nm. In some embodiments, for the at least one wavelength, nx3 is greater than nx2 by at least 0.05 or at least 0.1. For example, the first and third layers can be as described above, and the second layers can be THV layers having refractive indices of about 1.36 in each direction at 633 nm. In some embodiments, for the at least one wavelength, $|nx2-nx3|$ is less than 0.02, or less than 0.01, or less than 0.007, or less than 0.005. For example, the third layers can be styrenic block copolymer layers having refractive indices of about 1.49 in each direction at 633 nm while the second layers can be PMMA or coPMMA layers having refractive indices of about 1.49 in each direction at 633 nm.

In some embodiments, for each optical repeat unit, the first individual layer (e.g., one of the A and C layers) is positively birefringent (refractive index increases in stretch direction) and the second individual layer (e.g., the other of the A and C layers) is negatively birefringent (refractive index decreases in stretch direction). For example, in some embodiments, the first individual layer comprises polyethylene naphthalate (PEN), polyethylene terephthalate (PET), or polyhexylethylene naphthalate copolymer (PHEN) and in some such embodiments, or in other embodiments, the second individual layer comprises syndiotactic polystyrene (sPS).

In some embodiments, for at least one wavelength in a visible wavelength range extending from about 420 nm to about 680 nm, nx1 is greater than at least one of ny1 and nz1 by at least 0.15: nx2 is less than at least one of ny2 and nz2: and nx1 is greater than nx2 by at least 0.15, or at least 0.17, or at least 0.2, or at least 0.22, or at least 0.25. In some embodiments, for the at least one wavelength, nx lis greater than each of ny1 and nz1 by at least 0.15, and nx2 is less than each of ny2 and nz2 by at least 0.05. In some embodiments, for the at least one wavelength, nx1 is greater than one, but not the other, of ny1 and nz1 by at least 0.15. In some embodiments, for the at least one wavelength, nx2 is less than nz2 by at least 0.03 and $|nx2-ny2|<0.005$. In some embodiments, for the at least one wavelength, nx2 is less than nz2 by at least 0.04 and $|nx2-ny2|<0.003$. In some embodiments, for the at least one wavelength, nx1 is greater than at least one of ny1 and nz1 by at least 0.17, or at least 0.2, or at least 0.22, or at least 0.25. In some embodiments, for the at least one wavelength, nx1 is greater than at least one of ny1 and nz1 by up to about 0.45, or up to about 0.4, or up to about 0.35, for example. For example, the first individual layers can be PEN, PHEN, or PET layers uniaxially stretched along the x-direction or biaxially stretched along the x- and y-directions, and the second individual layers can be sPS layers uniaxially stretched along the x-direction or biaxially stretched along the x- and y-directions. In some embodiments, for the at least one wavelength, nx2 is less than ny2 by at least 0.005, or at least 0.01, or at least 0.02, or at least 0.05, or at least 0.1. In some embodiments, for the at least one wavelength, a magnitude of a difference between nx2 and ny2 is less than 0.005, or less than 0.003, or less than 0.002. In some embodiments, for the at least one wavelength, nz2 is greater than nz1 by at least 0.005, or at least 0.01, or at least 0.02, or at least 0.05, or at least 0.1.

In some embodiments, for each optical repeat unit, the first individual layer (e.g., one of the A and C layers) is substantially isotropic and the second individual layer (e.g., the other of the A and C layers) is negatively birefringent. For example, in some embodiments, the first individual layer comprises a copolyethylene naphthalate terephthalate copolymer (coPEN) or a poly hexylethylene naphthalate copolymer (PHEN): and the second individual layer comprises syndiotactic polystyrene (sPS).

In some embodiments, for at least one wavelength in a visible wavelength range extending from about 420 nm to about 680 nm, a magnitude of a maximum difference between nx1, ny1 and nz1 is less than 0.05: nx2 is less than at least one of ny2 and nz2: and nx1 is greater than nx2 by at least 0.07, or at least 0.08, or at least 0.09, or at least 0.1. In some embodiments, for the at least one wavelength, nx1 is greater than nx2 by up to 0.25, or up to 0.2, or up to 0.15, for example. In some embodiments, for the at least one wavelength, nx2 is less than each of ny2 and nz2 by at least 0.05, or at least 0.06, or at least 0.07. In some embodiments, for the at least one wavelength, nx2 is less than each of ny2 and nz2 by up to 0.2, or up to 0.15, or up to 0.12, for example. In some embodiments, for the at least one wavelength, nx2 is less than nz2 by at least 0.03 and $|nx2-ny2|<0.005$. In some embodiments, for the at least one wavelength, nx2 is less than nz2 by at least 0.04 and $|nx2-ny2|<0.003$. For example, the first individual layers can be coPEN layers and the second individual layers can be uniaxially or biaxially stretched sPS layers. As another example, the first individual layers can be isotropic PHEN layers and the second individual layers can be uniaxially or biaxially stretched sPS layers. In some embodiments, for the at least one wavelength, a magnitude of a maximum difference between nx1, ny1 and nz1 is less than 0.04, or less than 0.03, or less than 0.02, or less than 0.01, or less than 0.005. In some embodiments, for the at least one wavelength, nx2 is less than at least one of ny2 and nz2 by at least 0.005, or at least 0.01, or at least 0.02, or at least 0.05, or at least 0.1.

In some embodiments, the optical film 300 is a multilayer optical mirror. In some such embodiments, or in other embodiments, each of the optical repeat units 10 includes at least four sequentially arranged first through fourth individual layers. The first through fourth individual layers may be sequentially labeled in the plus or minus z-direction of FIG. 1B, for example, and the starting (first) layer may be, for example, an A layer or a C layer. For example, A, B1, C, B2 may be identified as an optical repeat unit including sequentially arranged first through fourth individual layers: or A, B2, C, B1 may be identified as an optical repeat unit including sequentially arranged first through fourth individual layers: or C, B2, A, B1 may be identified as an optical repeat unit including sequentially arranged first through fourth individual layers: or C, B1, A, B2 may be identified as an optical repeat unit optical repeat unit including sequentially arranged first through fourth individual layers. The total number of optical repeat units 10 can be in any of the ranges described elsewhere herein and the combined average thickness of the optical repeat units 10 can be in an of the ranges described elsewhere herein. The at least four sequentially arranged first through fourth individual layers can have thickness in the any of the respective ranges described elsewhere herein. In some embodiments, for each of the optical repeat units 10, an average thickness of each of the second and fourth individual layers (B1 and B2) is less than about 30 nm, or less than about 20 nm, or less than about 15 nm, or less than about 10 nm, or less than about 7.5 nm. In some embodiments, for each of the optical repeat units 10 an average thickness of each of the second and fourth individual layers (e.g., B1 and B2) is in a range of about 1 nm to about 30 nm, or about 3 nm to about 20 nm, for example.

The first (e.g., one of A and C) and third (e.g., the other of A and C) individual layers of each of the optical repeat units 10 can have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. In some embodiments, for at least one wavelength in a visible wavelength range extending from about 420 nm to about 680 nm, nx1 and ny1 are greater than the respective nx2 and ny2 by at least 0.1, and nz2 is greater than nz1 by at least 0.05. In some embodiments, the first individual layer comprises polyethylene naphthalate (PEN), polyethylene terephthalate (PET), or polyhexylethylene naphthalate copolymer (PHEN) and in some such embodiments, or in other embodiments, the third individual layer comprises syndiotactic polystyrene (sPS). For example, in some embodiments, the first individual layers are biaxially oriented PEN layers having refractive indices nx1, ny1, nz1 at 633 nm of about 1.76, 1.74 and 1.49, respectively, the third individual layers are biaxially oriented sPS layers having refractive indices nx2, ny2, nz2 at 633 nm of about 1.57, 1.57, and 1.62, respectively. In some such embodiments, or in other embodiments, the second and fourth layers are styrenic block copolymer layers having refractive indices of about 1.49 in each direction at 633 nm. In some embodiments, for the at least one wavelength, nx1 and ny1 are greater than the respective nx2 and ny2 by at least 0.12, or at least 0.14, or at least 0.16, or at least 0.18. In some embodiments, for the at least one wavelength, nx1 and ny1 are greater than the respective nx2 and ny2 by up to about 0.45, or about 0.4, or about 0.35, or about 0.3, for example. In some embodiments, for the at least one wavelength, nz2 is greater than nz1 by at least 0.06, or at least 0.07, or at least 0.08, or at least 0.09, or at least 0.1, or at least 0.11, or at least 0.12. In some embodiments, for the at least one wavelength, nz2 is greater than nz1 by up to about 0.3, or up to about 0.25, for example. In some embodiments, the optical film 300 is a multilayer optical mirror that utilizes negatively birefringent layers (e.g., sPS) to achieve a collimating effect (see, e.g., FIG. 9A) by lowering a transmission for larger angles of incidence (e.g., θ2) relative to a transmission at smaller angles of incidence (e.g., θ1).

The at least one wavelength in a range of 420 nm to 680 nm, may be or include at least one wavelength in a range of 430 nm to 670 nm, or in a range of 450 nm to 650 nm, or in a range of 480 nm to 640 nm, for example. The at least one wavelength in a range of 420 nm to 680 nm may be or include 633 nm, for example.

Figure 4A:
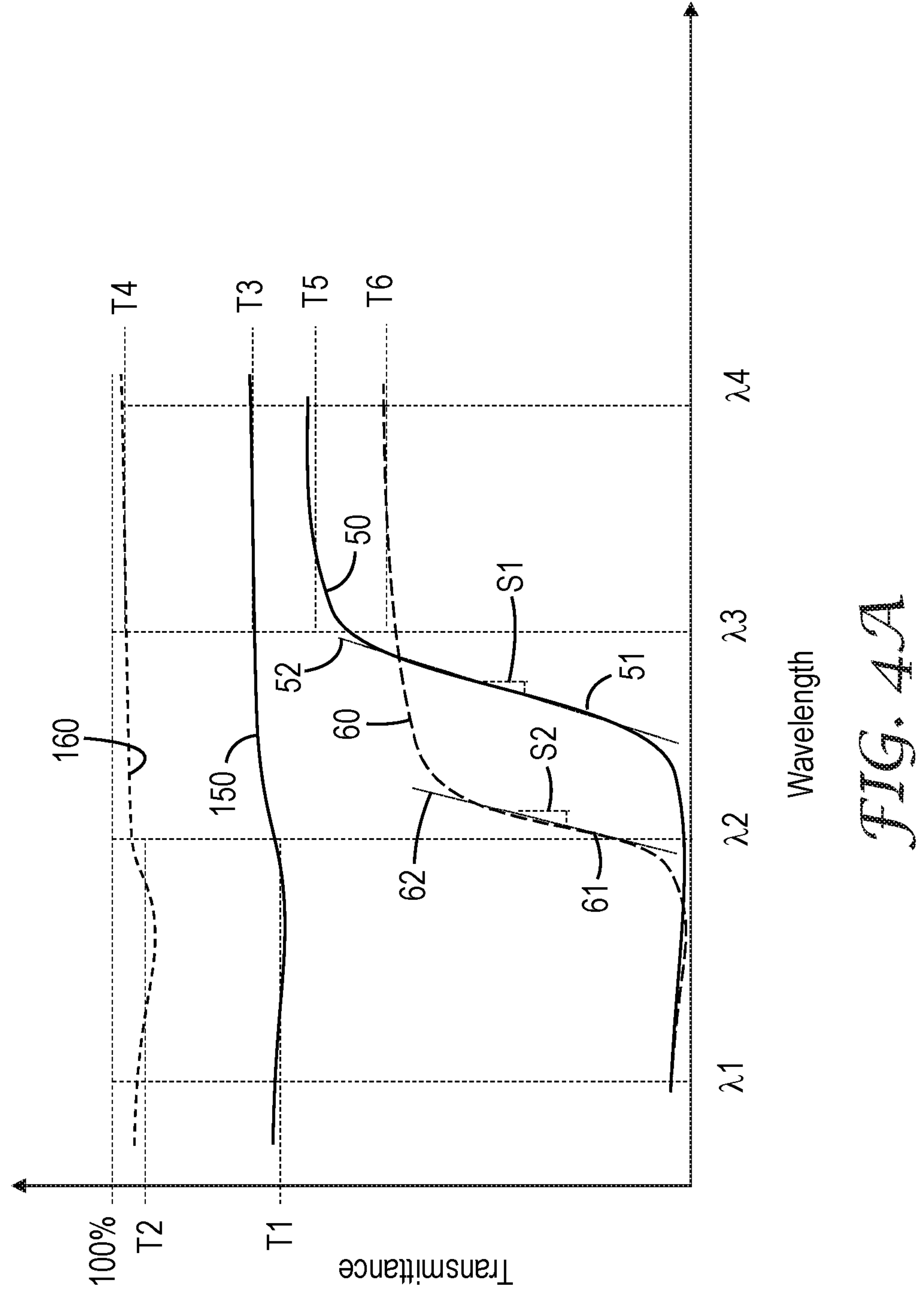
FIGS. 4A-4B are schematic plots of optical transmittances of a plurality of optical repeat units of a reflective polarizer, according to some embodiments.
Figure 4B:
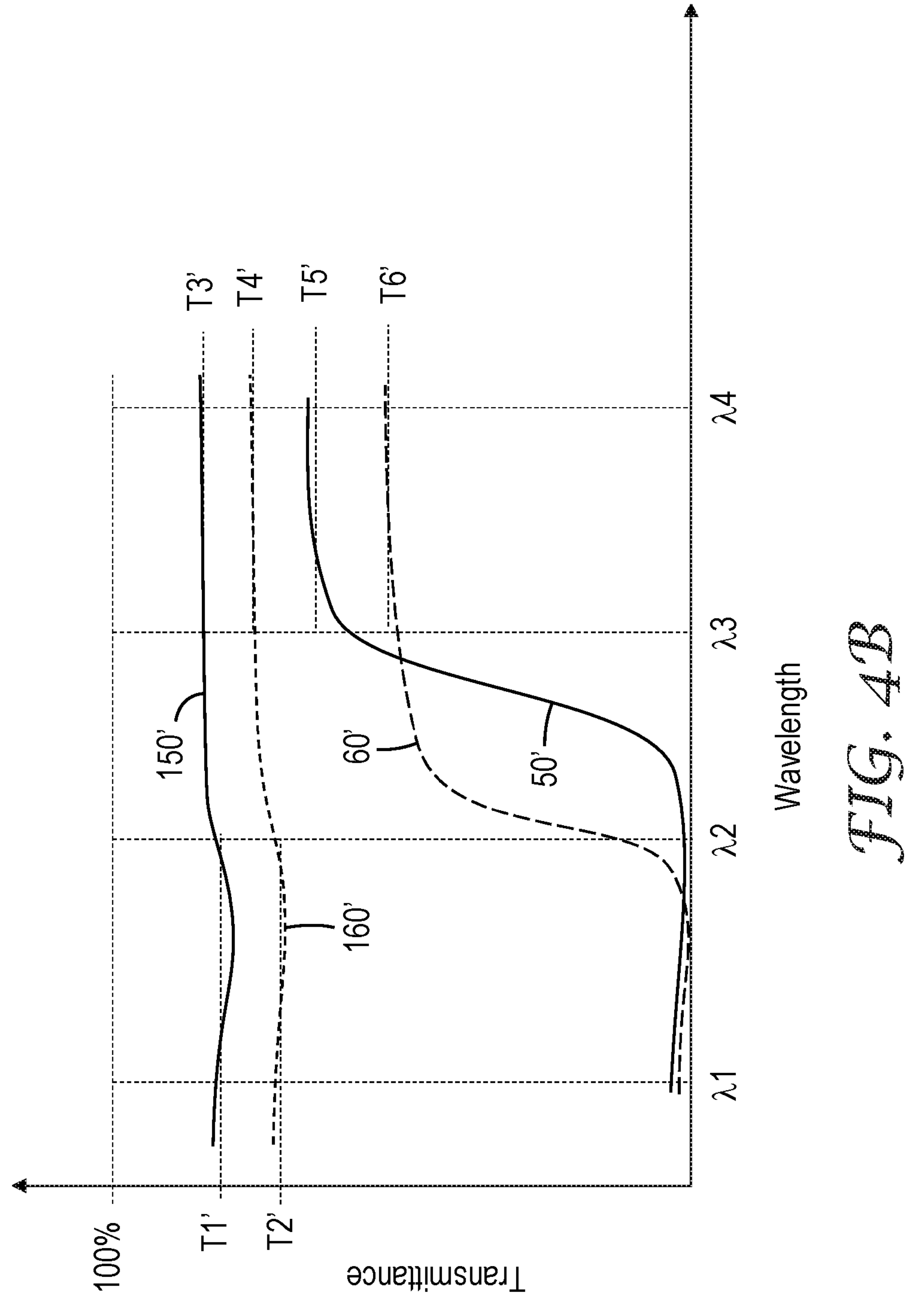

In some embodiments, the optical film 300 is a reflective polarizer. FIGS. 4A-4B are schematic plots of optical transmittances of a plurality of optical repeat units of a reflective polarizer for a light 30 incident on the reflective polarizer in an incident plane 40 (see, e.g., FIGS. 2A-2B), according to some embodiments. The optical transmittances 50 and 60 are for the first and second incident angles θ1 and θ2 (see, e.g., FIG. 1A), respectively, for an s-polarization state 32 when an in-plane first direction (x-direction) of the reflective polarizer lies in the incident plane 40. The optical transmittances 150 and 160 are for the first and second incident angles θ1 and θ2, respectively, for a p-polarization state 31 when an in-plane second direction (y-direction) of the reflective polarizer lies in the incident plane 40. The optical transmittances 150 and 160 have respective averages T1 and T2 in a visible wavelength range extending from 21 (e.g., about 400 nm, or about 420 nm, or about 450 nm) to 22 (e.g., about 650 nm, or about 680 nm, or about 700 nm). The visible wavelength range extending from λ1 to λ2 may be from about 420 nm to about 680 nm, for example. The optical transmittances 150, 160, 50, and 60 have respective averages T3, T4, T5, and T6 in an infrared wavelength range extending from 23 (e.g., about 720 nm, or about 750 nm, or about 800 nm) to 24 (e.g., about 1150 nm, or about 1200 nm, or about 1250 nm, or about 1300 nm). The infrared wavelength range extending from 23 to 24 may be from about 750 nm to about 1200 nm, for example. In some embodiments, when the in-plane second direction of the reflective polarizer lies in the incident plane 40 and for a visible wavelength range extending from λ1 to λ2 (e.g., about 420 nm to about 680 nm) and for the p-polarization state 31, the plurality of optical repeat units 10 has average optical transmittances T1 and T2 for the respective first and second incident angles θ1 and θ2, where T2 is greater than T1 by at least 5% or at least 7%. In some embodiments, for each of the first and second incident angles θ1 and θ2, for the s-polarization state 32 and the first direction lying in the incident plane and for the p-polarization state and the second direction lying in the incident plane, and for an infrared wavelength range extending from 23 to 24 (e.g., about 750 nm to about 1200 nm), the plurality of optical repeat units has an average optical transmittance (e.g., T3, T4, T5, T6) of greater than about 40%, or greater than about 45%, or greater than about 50%, or greater than about 55%, or greater than about 60%.

The optical transmittances 50' and 60' of FIG. 4B are for the first and second incident angles θ1 and θ2 (see, e.g., FIG. 1A), respectively, for a p-polarization state 31 when an in-plane first direction (x-direction) of the reflective polarizer lies in the incident plane 40. The optical transmittances 150' and 160' are for the first and second incident angles θ1 and θ2, respectively, for an s-polarization state 32 when an in-plane second direction (y-direction) of the reflective polarizer lies in the incident plane 40. The optical transmittances 150' and 160' have respective averages T1' and T2' in a visible wavelength range extending from λ1 to λ2. The optical transmittances 150', 160', 50', and 60' have respective averages T3', T4, T5', and T6' in an infrared wavelength range extending from μ3 to λ4. T1', T2, T3, T4', T5', and T6' can be in any of the respective ranges described for T1, T2, T3, T4, T5, and T6. In some embodiments, for each of the first and second incident angles θ1 and θ2, for each of the s- and p-polarization states, for each of the first and second directions lying in the incident plane 40, and for an infrared wavelength range extending from about 750 nm to about 1200 nm, the plurality of optical repeat units has an average optical transmittance (e.g., T3, T4, T5, T6, T3, T4', T5', T6') of greater than about 40%, or greater than about 45%, or greater than about 50%, or greater than about 55%, or greater than about 60%.

In some embodiments, for the first direction lying in the incident plane 40 and for the s-polarization state 32, the plurality of optical repeat units 10 has first and second optical transmittances 50 and 60 versus wavelength for the respective first and second incident angles θ1 and θ2, where the first and second optical transmittances 50 and 60 have respective first and second transmission band edges 51 and 61. In some embodiments, the band edge 51 and/or 61 has a sharp slope (e.g., greater than about 1.3%/nm). The band edge slope can be sharpened by including layers having a substantially sloped thickness profile at an end of a stack of optical repeat units as generally described in U.S. Pat. No. 6,967,778 (Wheatley et al.), for example. However, according to some embodiments, it has been found that using optical repeat units with at least four individual layers as described herein can result in sharp band edges without including the layers having a substantially sloped thickness profile. In some embodiments, a best linear fit (52 and 62) to each of the first and second band edges (51 and 61, respectively) at least across a wavelength range along the transmission band edge where the optical transmittance increases from about 10% to about 50%, has a positive slope (S1 and S2, respectively) of greater than about 1.3%/nm, or greater than about 1.4%/nm, or greater than about 1.5%/nm, or greater than about 1.6%/nm, or greater than about 1.7%/nm, or greater than about 1.8%/nm, greater than about 1.9%/nm, or greater than about 2%/nm. In some embodiments, each of the best linear fits 52 and 62 has an r-squared value of greater than about 0.7. In some embodiments, at least one of the best linear fits 52 and 62 has an r-squared value of greater than about 0.8. The best linear fits described herein can be linear least squares fits as is known in the art. Such fits minimize the sum of squares of residuals where a residual is the difference between data and the fitted line. The least squares analysis allows the r-squared value, sometimes referred to as the coefficient of determination, to be determined.

Figure 5:
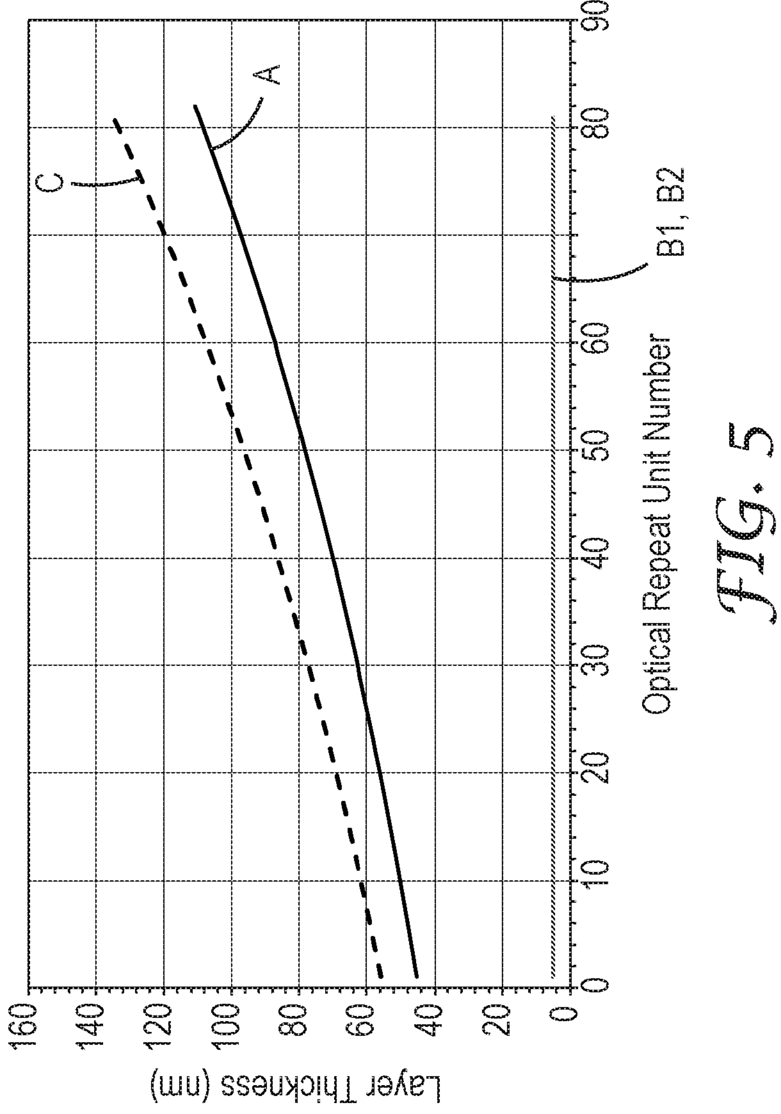
FIG. 5 is a layer thickness profile for a first exemplary reflective polarizer.

The thickness of an optical repeat unit determines the wavelengths reflected by the optical repeat unit and the refractive index differences between layers in the optical repeat unit determine the strength of the reflection. Accordingly, the optical transmittances of FIGS. 4A-4B, for example, can be achieved by suitable selection of layer materials to define refractive index differences and suitable selection of layer thickness profiles. In some embodiments, the A layers are uniaxially oriented PEN layers, the C layers are uniaxially oriented sPS layers, and the B1 and B2 layers are styrenic block copolymer layers. FIG. 5 is a plot of layer thickness versus optical repeat unit number for a reflective polarizer that may be formed from these materials. The layer thickness profile of FIG. 5 may alternatively be used for an optical mirror or other multilayer optical film. The B1. B2 layers have a thickness of 5 nm in each optical repeat units while the A and C layers are generally increasing in thickness across a thickness of the reflective polarizer. In some embodiments, when the optical repeat units are sequentially numbered from one side of the optical film to an opposite side of the optical film, the layer thickness versus optical repeat unit number has a generally concave upward shape for the A layers and for the C layers, while the B layers have a substantially constant thickness (e.g., varying by less than 10% or less than 5% across the thickness of the optical film). The optical repeat units of the reflective polarizer of FIG. 5 has a combined average thickness of about 14 micrometers.

Figure 6A:
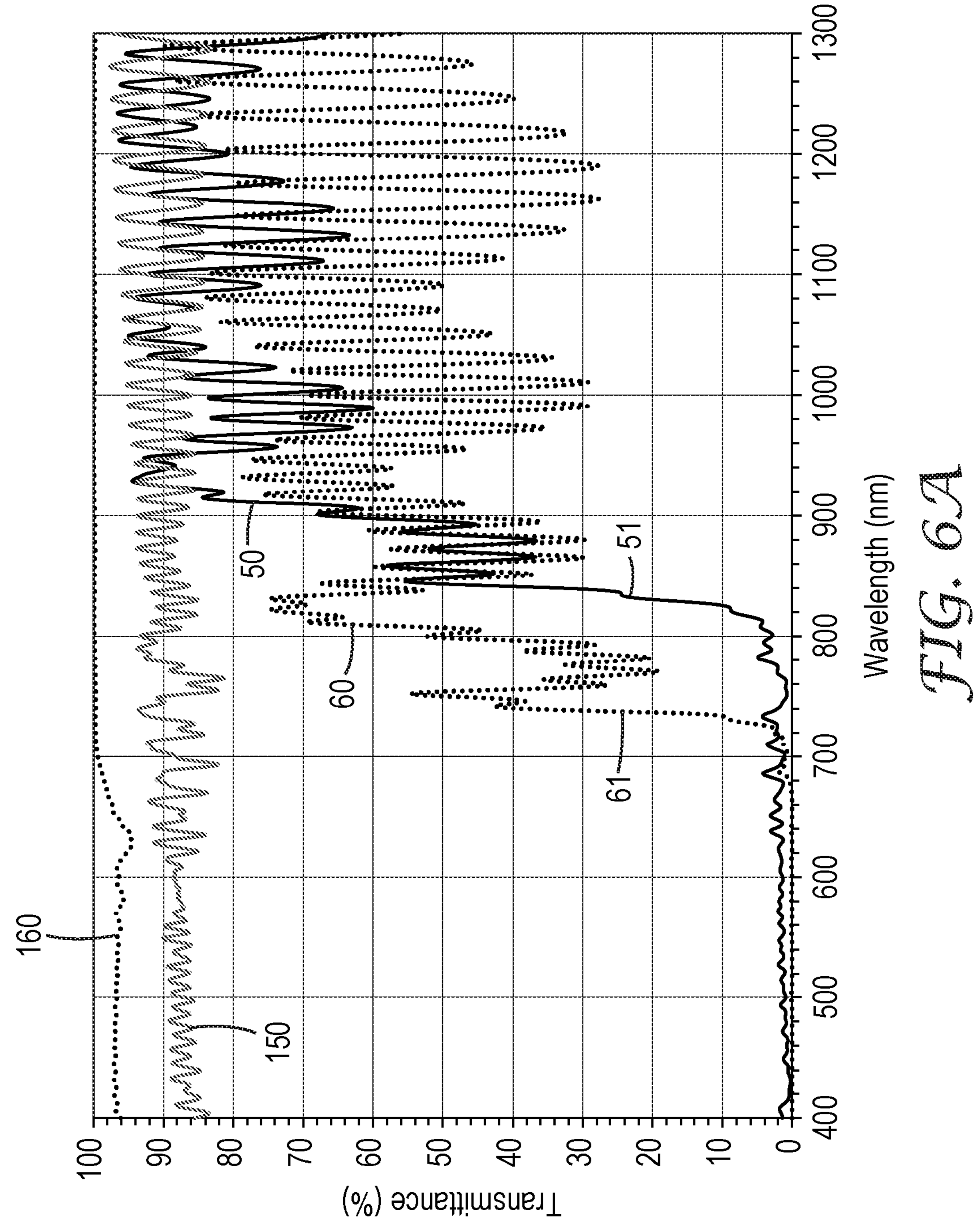
FIG. 6A is a plot of optical transmittances of the plurality of optical repeat units of the first exemplary reflective polarizer.

Given the refractive indices and layer thickness of the layers of a multilayer optical film, the optical transmission spectra of the optical film can be calculated using conventional optical modeling techniques. FIG. 6A is a plot of calculated optical transmittances of a plurality of optical repeat units of the reflective polarizer having the layer thickness profile shown in FIG. 5 for a light 30 incident on the reflective polarizer in an incident plane 40 (see. e.g., FIGS. 2A-2B) when the A layers are uniaxially oriented PEN layers, the C layers are uniaxially oriented sPS layers, and the B1 and B2 layers are styrenic block copolymer layers. Similar optical transmittances can be obtained when the B1 and B2 layers are acrylic block copolymer layers. PMMA layers, or coPMMA layers, for example. The optical transmittances 50, 60, 150, and 160 are for the polarization states and incident angles described for the corresponding optical transmittances of FIG. 4A with the first and second incident angles θ1 and θ2 being zero and 60 degrees, respectively, for FIG. 6A. For the visible wavelength range extending from about 420 nm to about 680 nm, the plurality of optical repeat units has average optical transmittances for the p-polarization state 31 when the in-plane second direction of the reflective polarizer lies in the incident plane 40 of 87.7% and 96.5% for the respective first and second incident angles θ1 and θ2 and average optical transmittances for the s-polarization state 32 when the in-plane first direction of the reflective polarizer lies in the incident plane 40 of 1.4% and 0.0% for the respective first and second incident angles θ1 and θ2. For the infrared wavelength range extending from about 750 nm to about 1200 nm, the plurality of optical repeat units has average optical transmittances for the p-polarization state 31 when the in-plane second direction of the reflective polarizer lies in the incident plane 40 of 90.0% and 99.8% for the respective first and second incident angles θ1 and θ2 and average optical transmittances for the s-polarization state 32 when the in-plane first direction of the reflective polarizer lies in the incident plane 40 of 62.1% and 53.1% for the respective first and second incident angles θ1 and θ2.

Figure 6B:
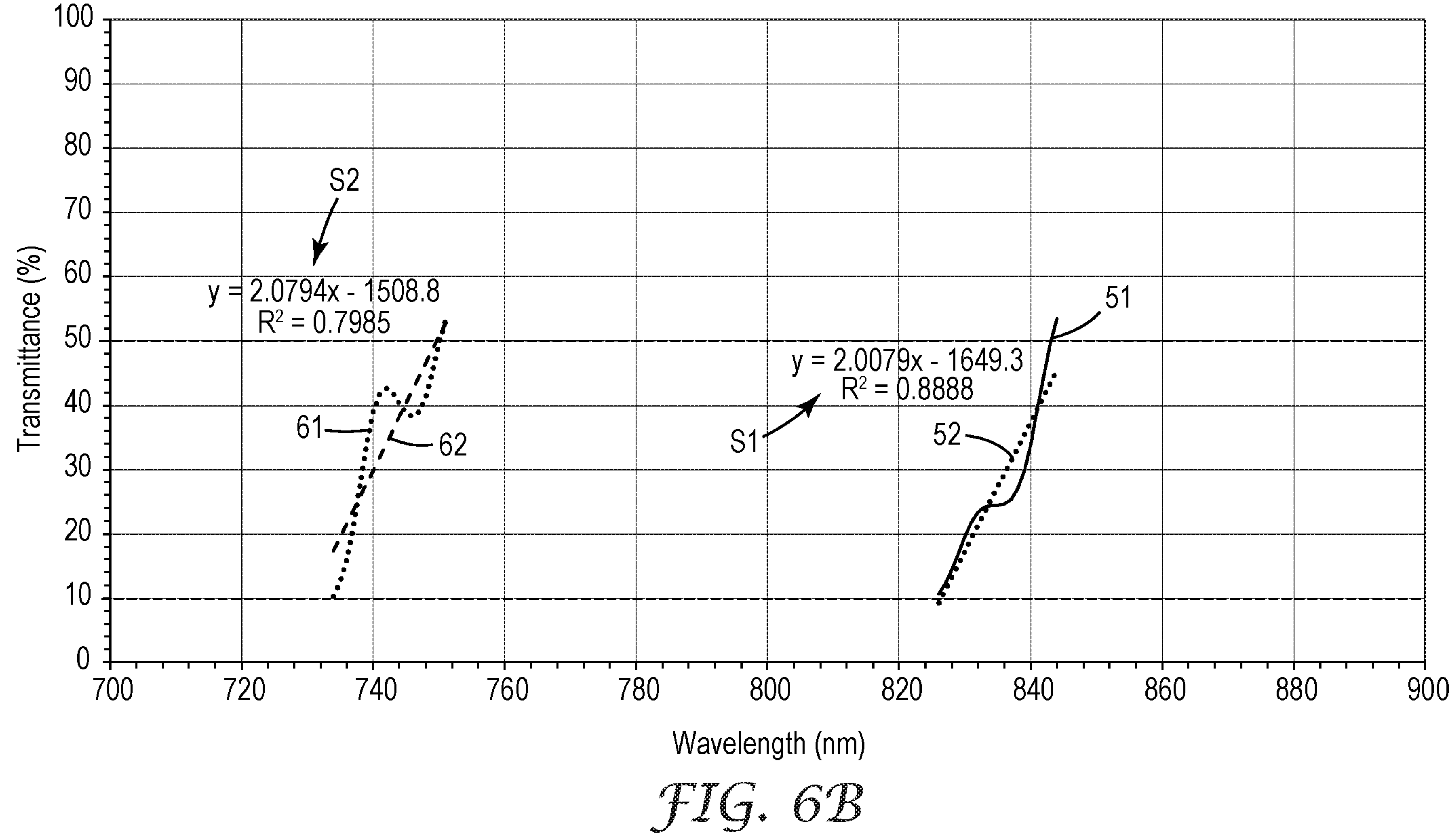
FIG. 6B is a portion of the plot of optical transmittances of FIG. 6A.

FIG. 6B is a portion of the plot of FIG. 6A expanded to show regions where the optical transmittances increase from about 10% to about 50%. The best linear fits 52 and 62 to the respective first and second band edges 51 and 61 across a wavelength range along the transmission band edge where the optical transmittance increases from about 10% to about 50% has respective positive slopes S1 and S2 of about 2.01%/nm and 2.08%/nm, respectively.

Figure 7:
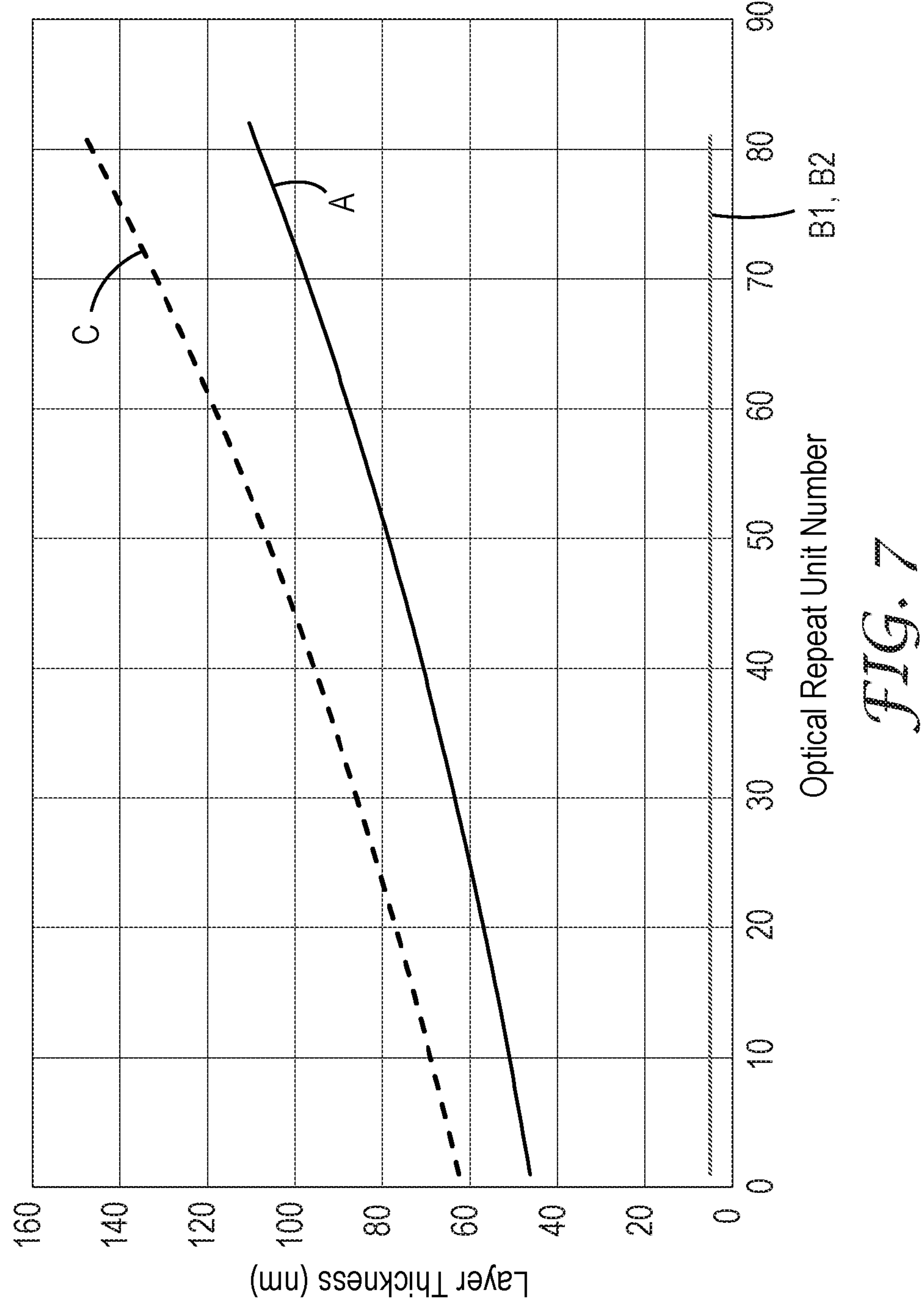
FIG. 7 is a layer thickness profile for a second exemplary reflective polarizer.
Figure 8:
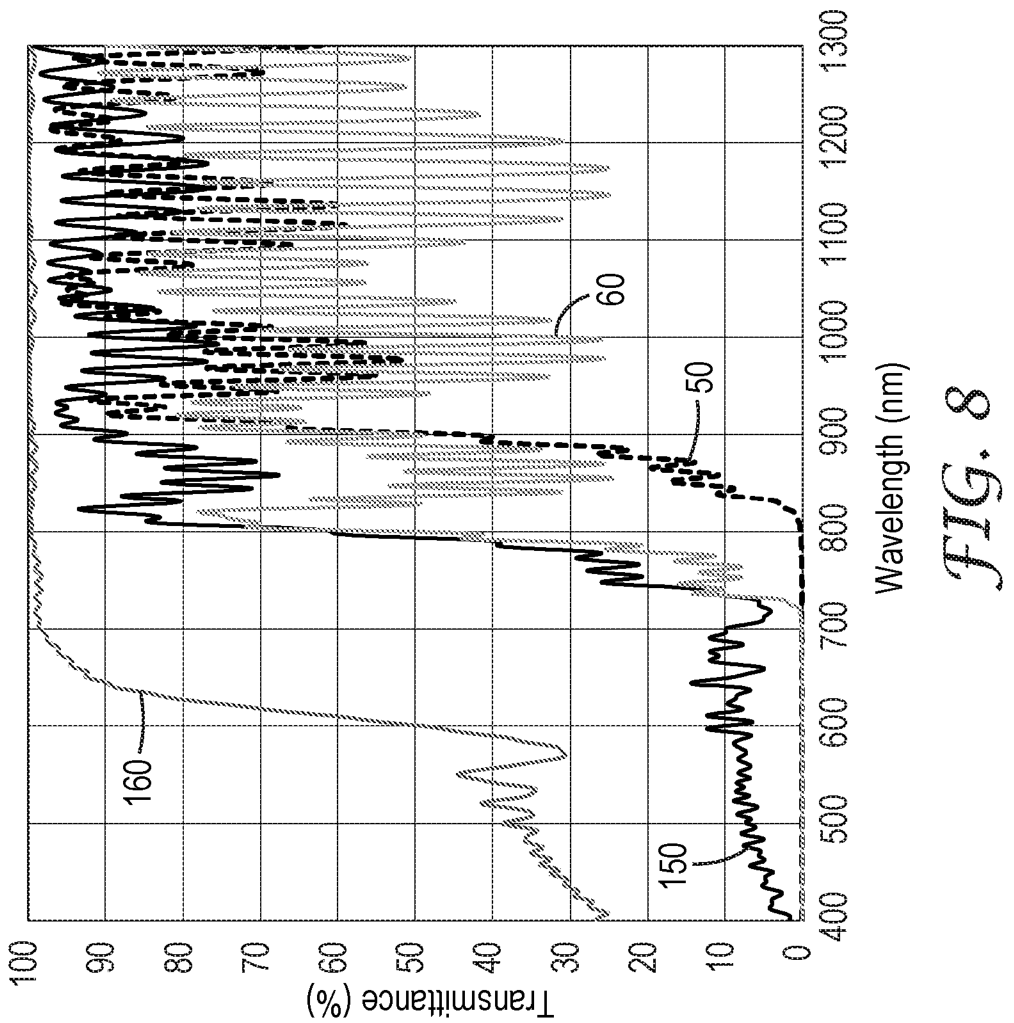
FIG. 8 is a plot of optical transmittances of the plurality of optical repeat units of the second exemplary reflective polarizer.

In some embodiments, the A layers are uniaxially oriented PHEN layers, the C layers are THV layers, and the B1 and B2 layers are coPMMA layers. FIG. 7 is a plot of layer thickness versus optical repeat unit number for a reflective polarizer that may be formed from these materials. The layer thickness profile of FIG. 7 may alternatively be used for an optical mirror or other multilayer optical film. The B1 and B2 layers each have a thickness of 5 nm in each optical repeat units while the A and C layers are generally increasing in thickness across a thickness of the reflective polarizer. The plurality of optical repeat units of the reflective polarizer has a combined average thickness of 15 micrometers. FIG. 8 is a plot of calculated optical transmittances of a plurality of optical repeat units of the reflective polarizer having the thickness profile shown in FIG. 7 for a light 30 incident on the reflective polarizer in an incident plane 40 (see, e.g., FIGS. 2A-2B) when the A layers are uniaxially oriented PHEN layers, the C layers are THV layers, and the B1 and B2 layers are coPMMA layers. Similar optical transmittances can be obtained when the B1 and B2 layers are styrenic block copolymer layers, acrylic block copolymer layers, or PMMA layers, for example. The optical transmittances 50, 60, 150, and 160 are for the polarization states and incident angles described for the corresponding optical transmittances of FIG. 4A with the first and second incident angles θ1 and θ2 being zero and 60 degrees, respectively, for FIG. 8. The reflective polarizer of FIG. 8 has a substantially lower average optical transmittance in the visible wavelength range of 420 nm to 680 nm compared to the reflective polarizer of FIG. 6A for each of the first and second incident angles θ1 and θ2.

Figure 9A:
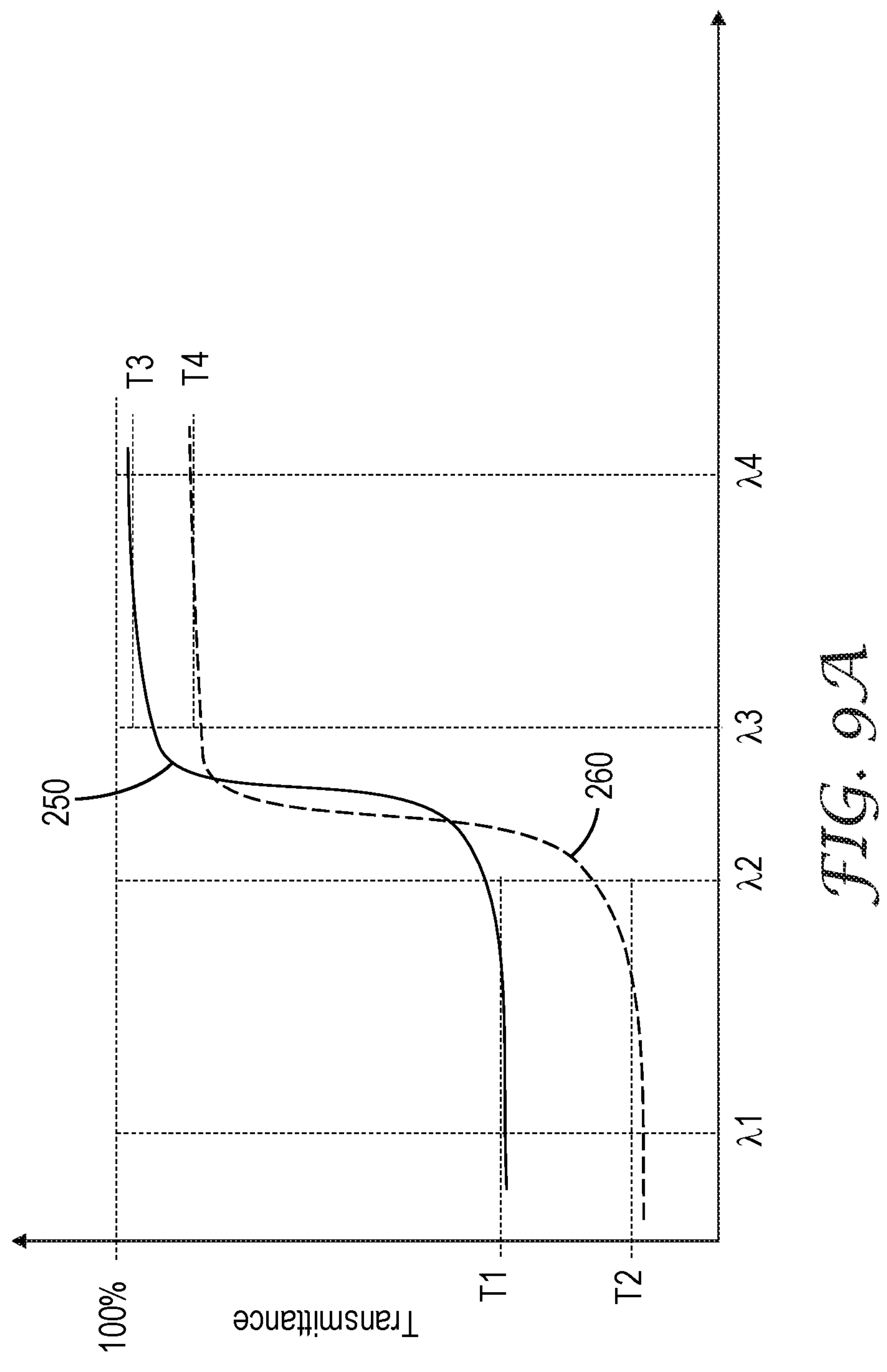
FIGS. 9A-9B are schematic plots of optical transmittances of a plurality of optical repeat units of an optical mirror, according to some embodiments.
Figure 9B:
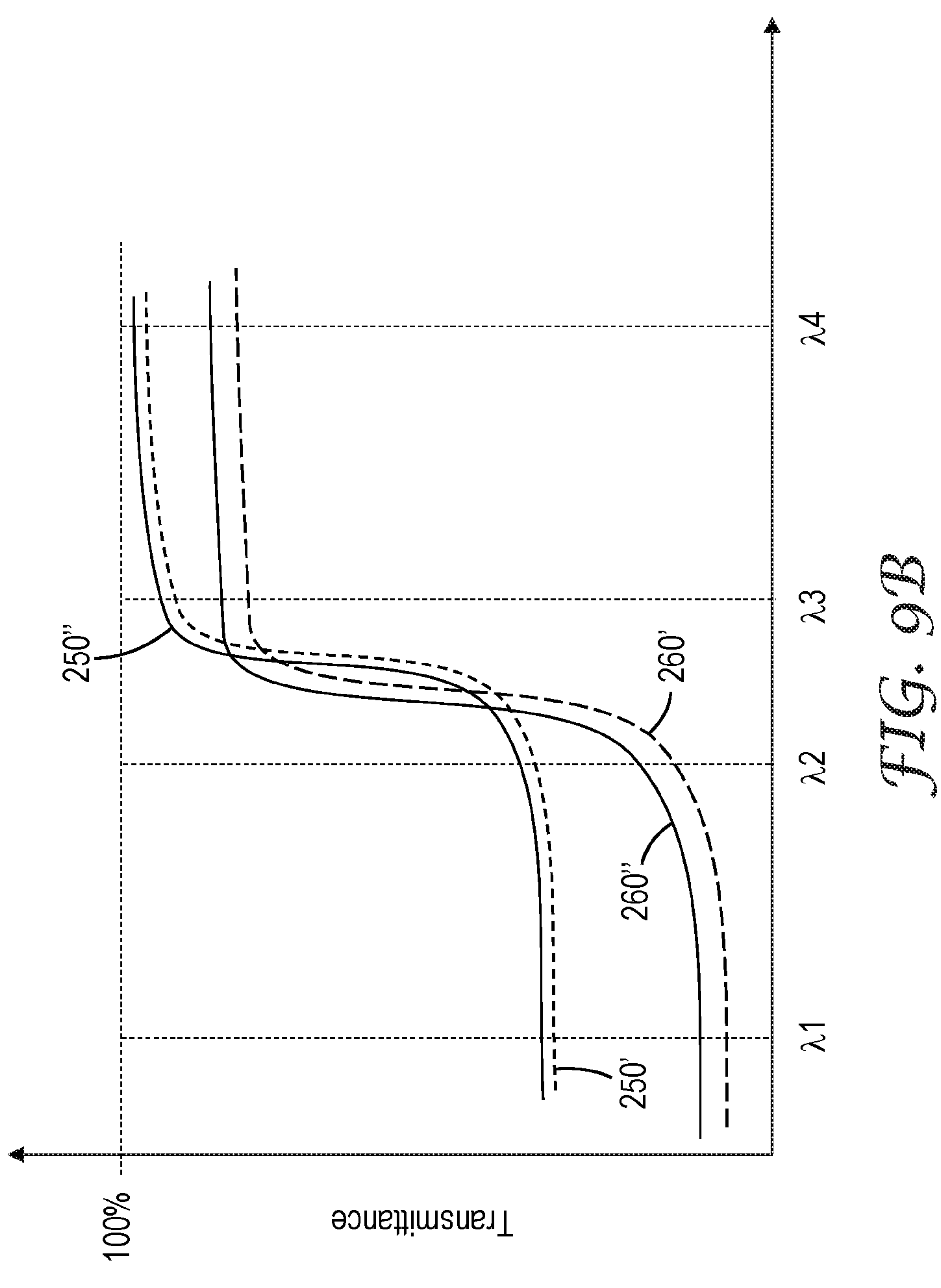

In some embodiments, the optical film 300 is a multilayer optical mirror. FIGS. 9A-9B are plots of optical transmittances for an incident light 30, 130, or 230 incident on a multilayer optical mirror. The optical transmittances 250, 250', 250" are for a first incident angle θ1 which can be less than about 5 degrees or can be in any range described elsewhere herein for 01, and the optical transmittances 260, 260', 260" are for a second incident angle θ2 which can be greater than about 40 degrees or can be in any range described elsewhere herein for θ2. The optical transmittances 250 and 260 may be for any specified polarization state or for an unpolarized incident light. The optical transmittances 250' and 260' are for s-polarized light and the optical transmittances 250" and 260" are for p-polarized light. In some embodiments, the optical transmittance is approximately the same for each of mutually orthogonal first and second polarization states (e.g., for each of the p- and s-polarization states 31 and 32, or for each of two mutually orthogonal linear combinations of the p- and s-polarization states 31 and 32). In some embodiments, for a light 30 incident on the multilayer optical mirror, for each of mutually orthogonal first and second polarization states, and for a visible wavelength range extending from λ1 to λ2 (e.g., from about 420 nm to about 680 nm), the plurality of optical repeat units 10 has an average optical transmittance T1 for the first incident angle θ1, and an average optical transmittance T2 for the second incident angle θ2, where T1/T2≥1.2, or T1/T2≥1.4, or T1/T2≥1.6, or T1/T2≥1.8, or T1/T2≥2, or T1/T2≥2.2, or T1/T2≥2.4, or T1/T2≥2.6. T1/T2 may be up to 10, or up to 8, or up to 6, or up to 5, for example.

In some embodiments, T1 is larger than T2 due to the A layers having in-plane refractive indices greater than the corresponding in-plane refractive indices of the C layers while the C layers have a refractive index in the thickness direction greater than that of the A layers. In some embodiments, this is achieved using negatively birefringent C layers. For example, the A layers can be biaxially oriented PEN layers having refractive indices nx1, ny1, nz1 at 633 nm of about 1.76, 1.74 and 1.49, respectively, and the C layers can be biaxially oriented sPS layers having refractive indices nx2, ny2, nz2 at 633 nm of about 1.57, 1.57, and 1.62, respectively. In other embodiments. T1 may be about equal to T2 or T1 may be smaller than T2. In some embodiments, for a light 30 incident on the multilayer optical mirror, for each of mutually orthogonal first and second polarization states, and for an infrared wavelength range extending from 23 to 24 (e.g., from about 750 nm to about 1200 nm), the plurality of optical repeat units 10 has an average optical transmittance T3 for the first incident angle θ1, and an average optical transmittance T4 for the second incident angle θ2, where T3 and T4 are each greater than about 40%, or greater than about 45%, or greater than about 50%, or greater than about 55%, or greater than about 60%.

Figure 10:
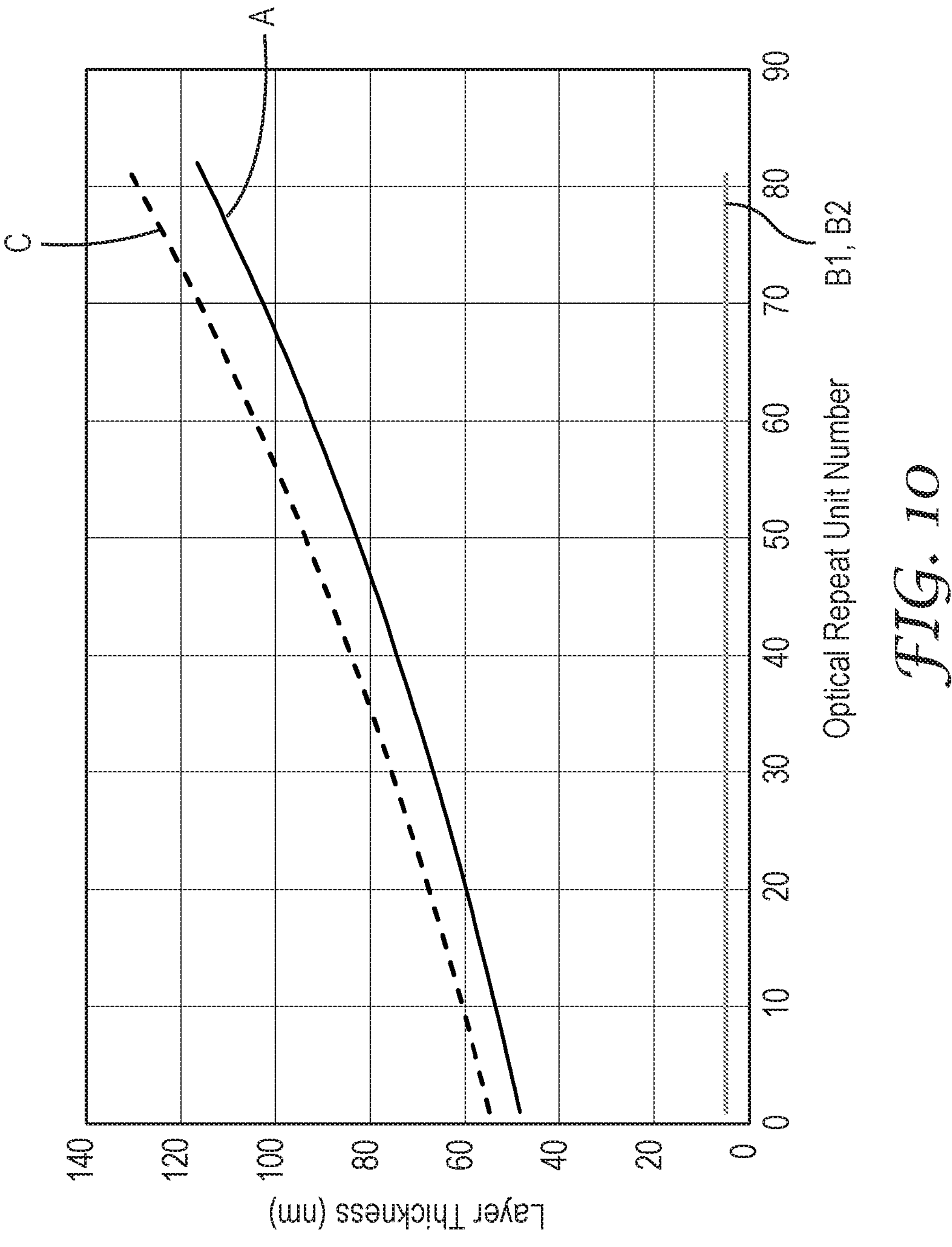
FIG. 10 is a layer thickness profile for a first exemplary optical mirror.
Figure 11:
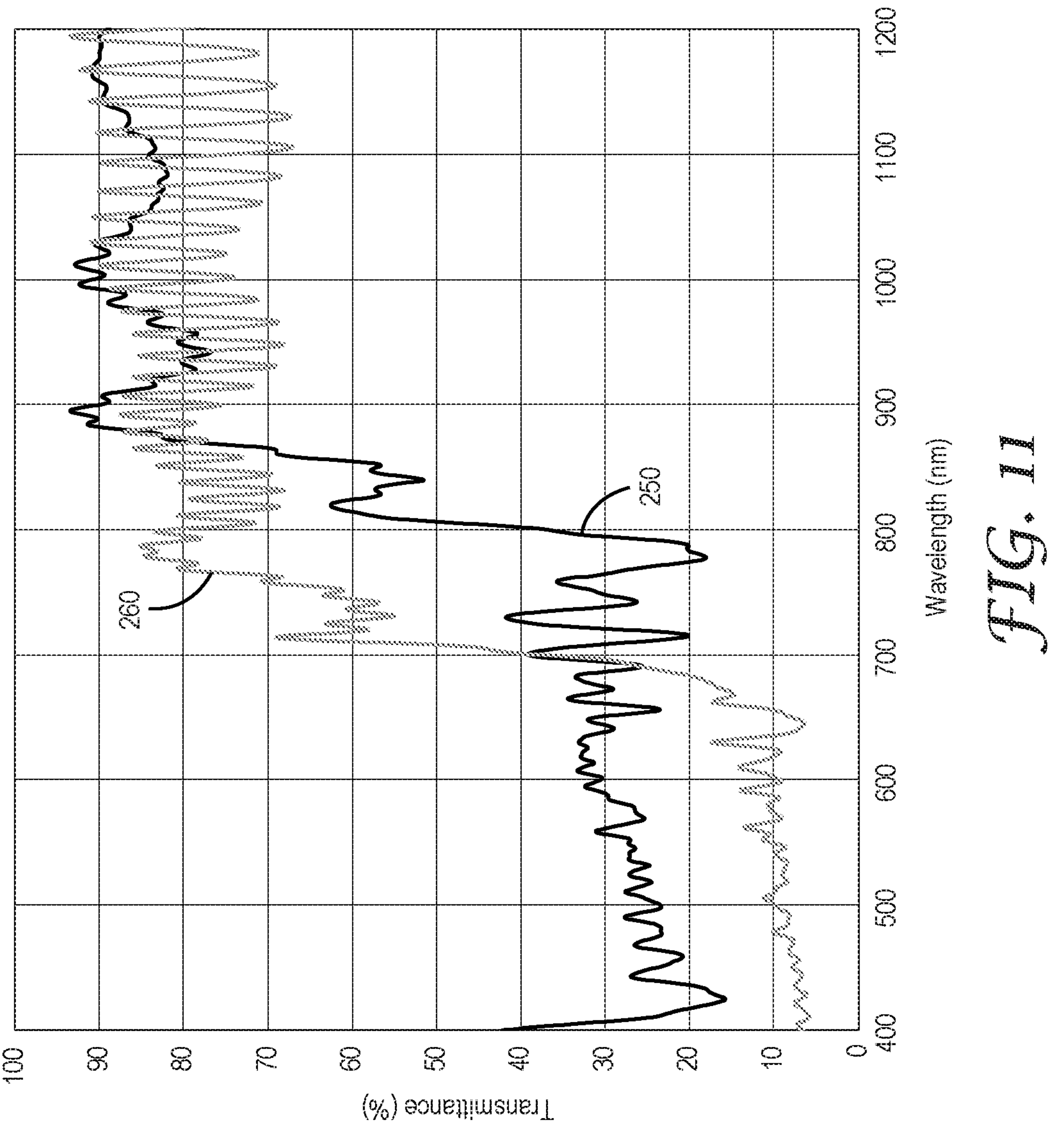
FIG. 11 is a plot of optical transmittances of the plurality of optical repeat units of the first exemplary optical mirror.

The optical transmittances of FIGS. 9A-9B, for example, can be achieved by suitable selection of layer materials to define refractive index differences and suitable selection of layer thickness profiles. In some embodiments, the A layers are biaxially oriented PEN layers, the C layers are biaxially oriented sPS layers, and the B1 and B2 layers are styrenic block copolymer layers. FIG. 10 is a plot of layer thickness versus optical repeat unit number for an optical mirror that may be formed from these materials. The layer thickness profile of FIG. 10 may alternatively be used for a reflective polarizer or other multilayer optical film. The B1. B2 layers have a thickness of 5 nm in each optical repeat units while the A and C layers are generally increasing in thickness across a thickness of the optical mirror. The optical repeat units of the optical mirror have a combined average thickness of about 14 micrometers. FIG. 11 is a plot of calculated optical transmittances of a plurality of optical repeat units of the optical mirror having the thickness profile shown in FIG. 10 for an unpolarized light incident on the optical mirror in an incident plane 40 (see. e.g., FIGS. 2A-2B) when the A layers are biaxially oriented PEN layers, the C layers are biaxially oriented sPS layers, and the B1 and B2 layers are styrenic block copolymer layers. Similar optical transmittances can be obtained when the B1 and B2 layers are acrylic block copolymer layers. PMMA layers, or coPMMA layers, for example. The optical transmittances 250 and 260 are for respective first and second incident angles θ1 and θ2 as generally described for FIG. 9A with the first and second incident angles θ1 and θ2 being zero and 60 degrees, respectively, for FIG. 11.

Figure 12:
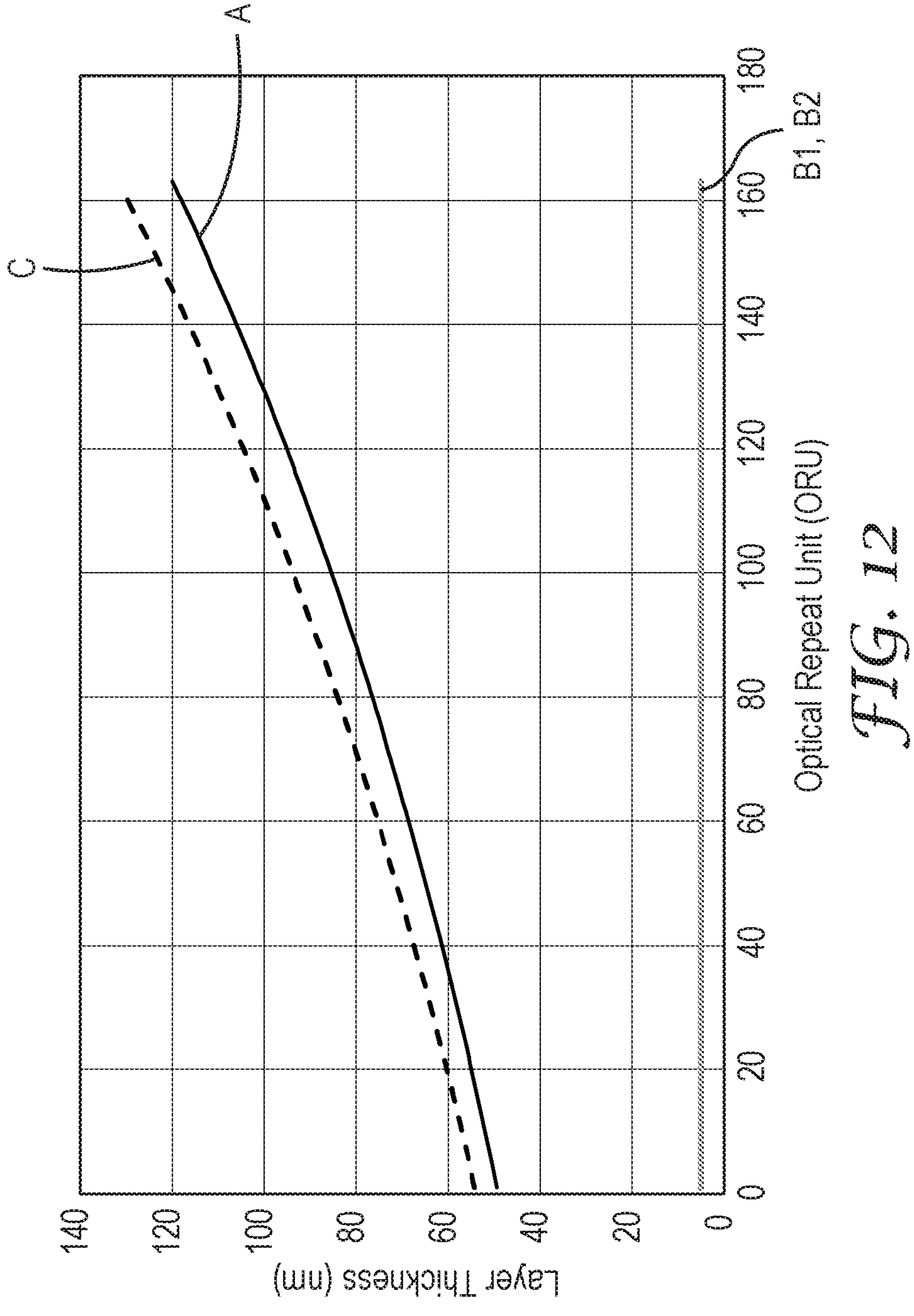
FIG. 12 is a layer thickness profile for a second exemplary optical mirror.
Figure 13:
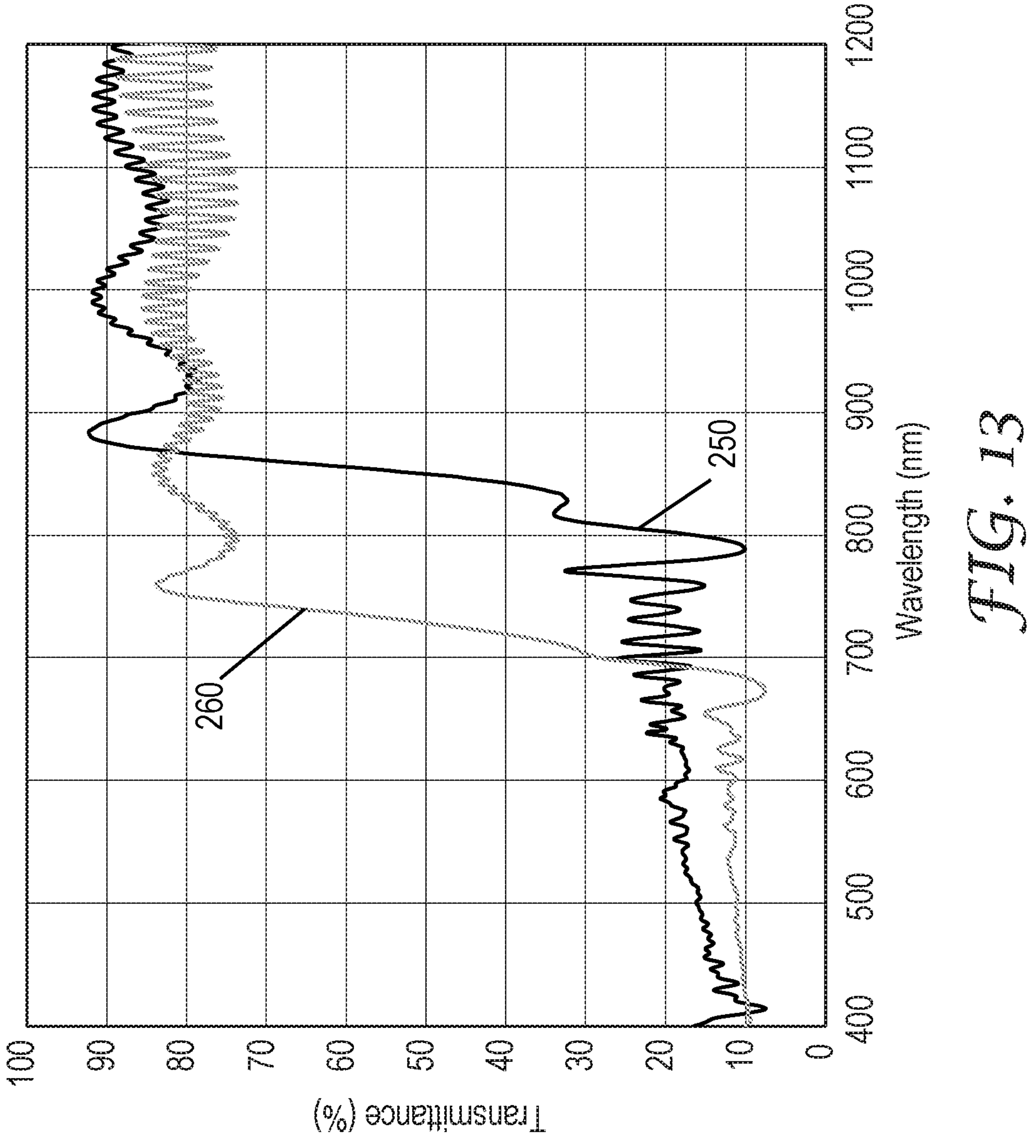
FIG. 13 is a plot of optical transmittances of the plurality of optical repeat units of the second exemplary optical mirror.

In some embodiments, the A layers are isotropic PHEN layers, the C layers are biaxially oriented sPS layers, and the B and B2 layers are styrenic block copolymer layers. FIG. 12 is a plot of layer thickness versus optical repeat unit number for an optical mirror that may be formed from these materials. The layer thickness profile of FIG. 12 may alternatively be used for a reflective polarizer or other multilayer optical film. The B1. B2 layers have a thickness of 5 nm in each optical repeat units while the A and C layers are generally increasing in thickness across a thickness of the optical mirror. The optical repeat units of the optical mirror have a combined average thickness of 28 micrometers. FIG. 13 is a plot of calculated optical transmittances of a plurality of optical repeat units of the optical mirror having the thickness profile shown in FIG. 12 for an unpolarized light incident on the mirror in an incident plane 40 (see. e.g., FIGS. 2A-2B) when the A layers are isotropic PHEN layers, the C layers are biaxially oriented sPS layers, and the B1 and B2 layers are styrenic block copolymer layers. Similar optical transmittances can be obtained when the B1 and B2 layers are acrylic block copolymer layers. PMMA layers, or coPMMA layers, for example. The optical transmittances 250 and 260 are for respective first and second incident angles θ1 and θ2 as generally described for FIG. 9A with the first and second incident angles θ1 and θ2 being zero and 60 degrees, respectively, for FIG. 13. In the embodiment of FIGS. 12-13, the average transmittance in the visible wavelength range of 420 nm to 680 nm is greater at normal incidence than at an incidence angle of 60 degrees.

Figure 14:
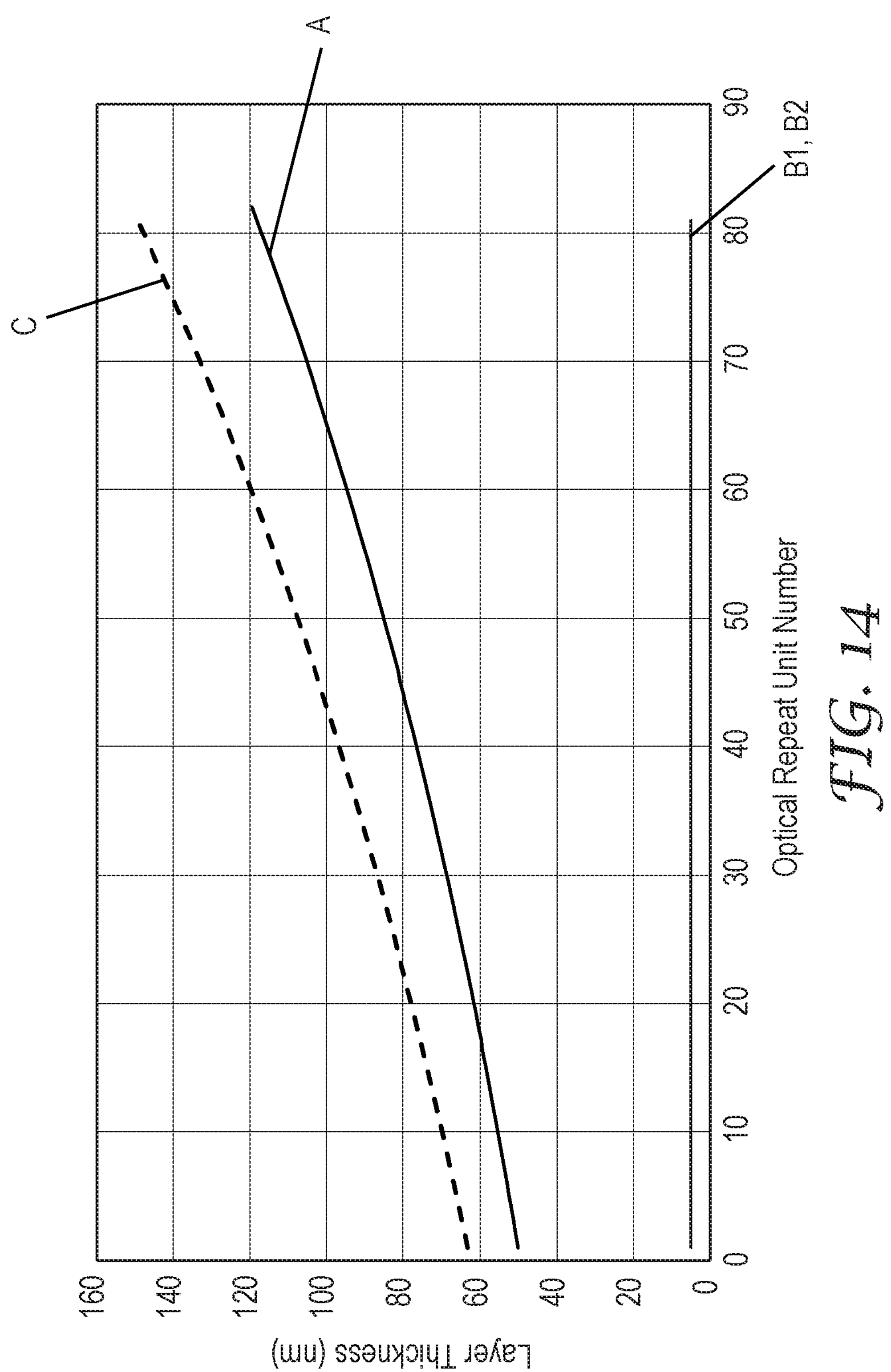
FIG. 14 is a layer thickness profile for a third exemplary optical mirror.
Figure 15:
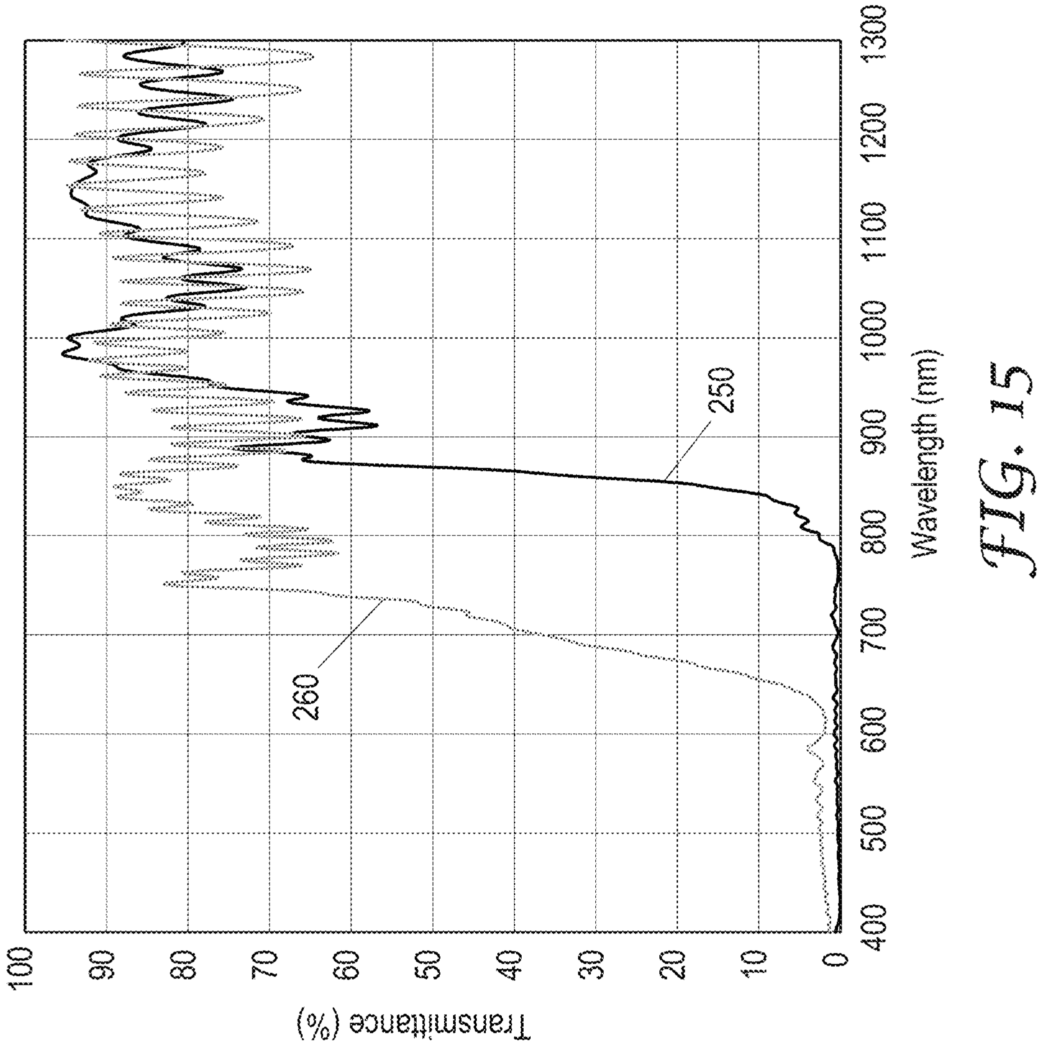
FIG. 15 is a plot of optical transmittances of the plurality of optical repeat units of the third exemplary optical mirror.

In some embodiments, the A layers are biaxially oriented PHEN layers, the C layers are THV layers, and the B1 and B2 layers are coPMMA layers. FIG. 14 is a plot of layer thickness versus optical repeat unit number for an optical mirror that may be formed from these materials. The layer thickness profile of FIG. 14 may alternatively be used for a reflective polarizer or other multilayer optical film. The B1, B2 layers have a thickness of 5 nm in each optical repeat units while the A and C layers are generally increasing in thickness across a thickness of the optical mirror. The optical repeat units of the optical mirror have a combined average thickness of about 15 micrometers. FIG. 15 is a plot of calculated optical transmittances of a plurality of optical repeat units of the optical mirror having the thickness profile shown in FIG. 14 for an unpolarized light incident on the optical mirror in an incident plane 40 (see. e.g., FIGS. 2A-2B) when the A layers are biaxially oriented PHEN layers, the C layers are THV layers, and the B1 and B2 layers are coPMMA layers. Similar optical transmittances can be obtained when the B1 and B2 layers are styrenic block copolymer layers, acrylic block copolymer layers, or PMMA layers, for example. The optical transmittances 250 and 260 are for respective first and second incident angles θ1 and θ2 as generally described for FIG. 9A with the first and second incident angles θ1 and θ2 being zero and 60 degrees, respectively, for FIG. 15. In the embodiment of FIGS. 14-15, the average transmittance in the visible wavelength range of 420 nm to 680 nm at normal incidence is less than about 5% while the optical repeat units have a combined average thickness of only about 15 micrometers.

Any of the multilayer optical films, reflective polarizers, and multilayer optical mirrors described herein may have an interlayer adhesion of individual layers in the plurality of optical repeat units of at least about 14 grams per inch (at least about 5.5 g/cm) when measured at a 90 degree peel angle. In some embodiments, the interlayer adhesion of the individual layers in the plurality of optical repeat units is at least about 16, 18, 20, 22, 25, 27, 30, 32, 35, 37, 40, 45, 50, or 55 grams per inch when measured at a 90 degree peel angle. In some embodiments, the interlayer adhesion can be up to about 400 grams per inch, or up to about 200 grams per inch, or up to about 150 grams per inch, or up to about 120 grams per inch, for example. In some embodiments, the interlayer adhesion is in a range of about 14 grams per inch to about 400 grams, or about 20 grams per inch to about 200 grams per inch, for example. The peel force can be increased by suitable selection of materials for the A, B1, C and B2 layers. For example, the B1. B2 layers can be chosen to have adequate bonding to the A and C layers even when the A and C layers would have poor direct bonding to one another. In some embodiments, the B1, B2 layers may be copolymers of the polymers used in the A and C layers. Suitable materials for the A, B1, C and B2 layers are described further elsewhere herein. It has been found that the interlayer adhesion can be further increased, according to some embodiments, by lowering the temperature when stretching the film (e.g., from about 135° C. to about 120° C., or to about 115° C.) and/or by increasing the draw ratio (e.g., from a draw ratio of about 5 along a stretch direction to a draw ratio of about 6 along the stretch direction) used in stretching the film.

Figure 16:
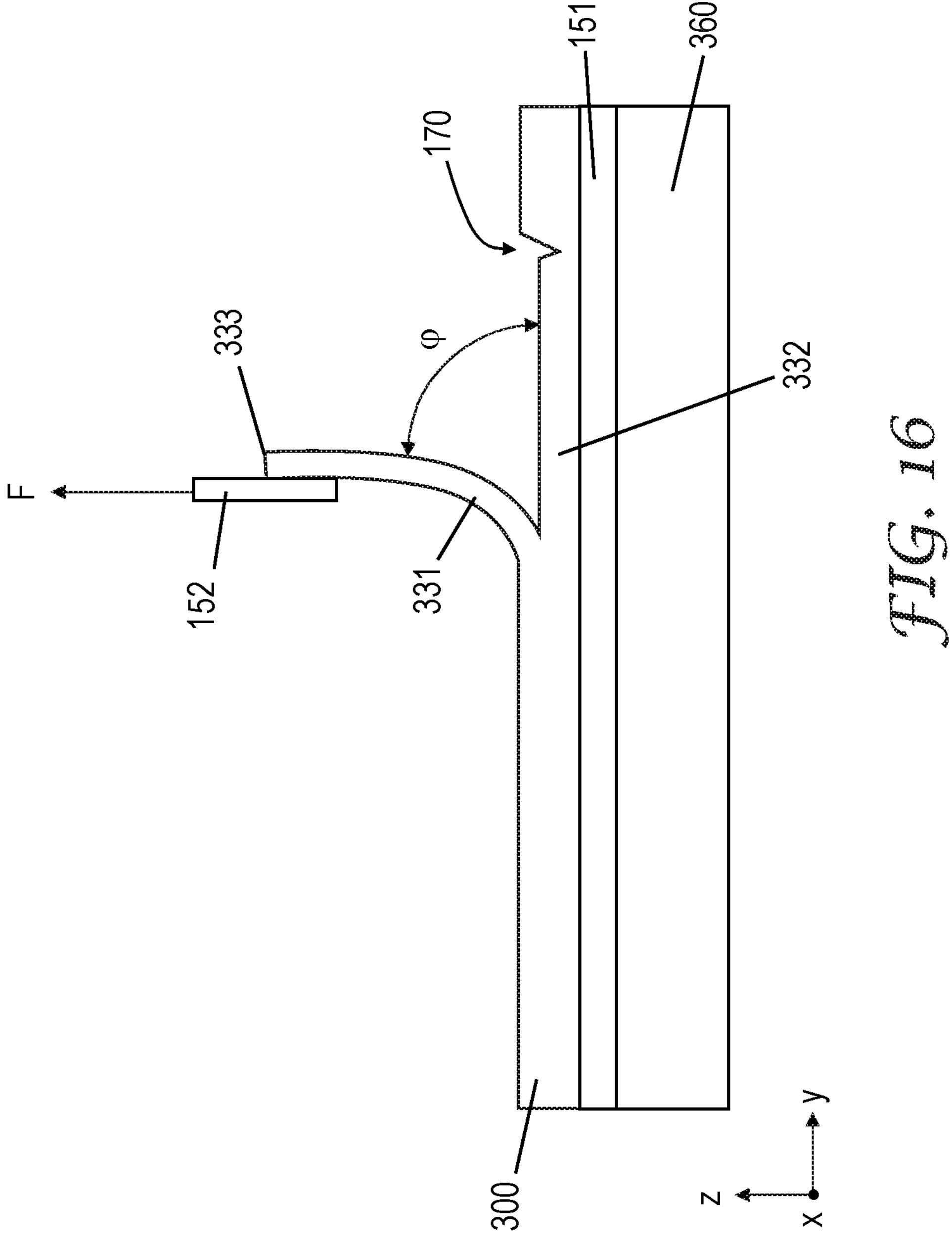
FIG. 16 is a schematic illustration of testing a multilayer optical film for interlayer adhesion.

FIG. 16 is a schematic illustration of testing a multilayer optical film 300 for interlayer adhesion. The multilayer optical film 300 is bonded to a substrate 360 (e.g., a rigid glass substrate) via a double sided tape 151. Then a razor blade, for example, is used to form a cut 170 into the optical film 300. Next, another piece of tape 152 is used to peel an end 333 of a portion 331 of the optical film 300 adjacent the cut 170 from a remaining portion 332 of the optical film 300. The peel force can then be measured by pulling the tape 152 in a direction (z-direction) away from the substrate 360 defining a 90 degree peel angle q. The peel force per unit width (dimension in the x-direction) of the optical film 300 is the interlayer adhesion. In some embodiments, the peel force is determined using a pull speed (also referred to as crosshead speed) of 12 inches per minute and averaging the measured force over a time of at least about 5 seconds. In some embodiments, the peel force per unit width is the average resistance-to-peel strength determined according to the ASTM D6862—11 (Reapproved 2016) test standard except that a crosshead speed of 12 inches per minute is used. In some embodiments, the interlayer adhesion of the individual layers in the plurality of optical repeat units is at least about 14 grams per inch, or the interlayer adhesion can be in any range described elsewhere herein, where the interlayer adhesion is determined as an average resistance-to-peel strength measured according to the ASTM D6862—11 (Reapproved 2016) test standard except that a crosshead speed of 12 inches per minute is used to pull an upper portion 331 of the multilayer optical film 300 at a 90 degree peel angle from a lower portion 332 of the multilayer optical film 300 while the lower portion 332 is bonded to a substrate 360.

Examples

| Material | Description | Obtained from |
|---|---|---|
| PEN | Polyethylene naphthalate | Made as described in U.S. Pat. No. 10,001,587 (Liu), paragraph 0044 |
| Low Melt PEN | Copolyethylene naphthalate terephthalate copolymer including 90 mole percent naphthalene dicarboxylate groups based on total carboxylate groups | Made as described for CoPEN9010 in U.S. Pat. No. 10,001,587 (Liu), paragraph 0045 |
| PET | Polyethylene terephthalate | Nan Ya Plastics Corporation, America (Lake City, SC) |
| PEN/PET | Blend of PEN and PET at a weight ratio of 70 parts PEN to 30 parts PET | Made by blending 70 parts PEN and 30 parts PET |
| sPS | Syndiotactic polystyrene | Idemitsu Kosan Co., Ltd. (Tokyo, Japan) |
| KRATON G1645 | Styrenic block copolymer available under the tradename KRATON G1645 | KRATON Polymers (Houston, TX) |
| KRATON G1657 | Styrenic block copolymer available under the tradename KRATON G1657 | KRATON Polymers (Houston, TX) |
| PETG | Glycol modified PET available under the tradename GN071 | Eastman Chemical Company (Kingsport, TN) |

Multilayer optical films including 37 A layers, 76 B layers, and 38 C layers were made using a 151-layer feedblock and die. The A, B, and C layers were optical layers arranged into ABCB repeat units. In addition, outermost skin layers were added by extruding the resin indicated in the table below for the A layers through a 25 mm twin screw extruder (TSE) at a feed rate of 20 pounds per hour through a neck tube and gear pump. This melt train used a progressive temperature extrusion profile, with peak temperature at 280° C. The A layers were produced by extruding the resin indicated in the table below through a 27 mm TSE at the feed rate indicated in the table below with a progressive temperature profile peaking at 280° C. through a neck tube and gear pump into corresponding A layers of the 151-layer feedblock and die except that about 20% of the material listed for the A layers were used to form protective boundary layers between the optical layers and the skin layers. The B layers were produced by extruding the resin indicated in the table below through a 18 mm TSE at the feed rate indicated in the table below through a neck tube and gear pump into corresponding B layers of the 151-layer feedblock and die with a progressive temp profile was used with peak temperature of 260° C. The C layers were produced by extruding the resin indicated in the table below through a 27 mm TSE at the feed rated indicated in the table below with a progressive temperature profile peaking at or around 280° C. through a neck tube and gear pump into the corresponding C layers of the 151-layer feed block and die. The feedblock used a gradient plate such that the A and C layers were about 2.5 times thicker at one side of the film than at the opposite side of the film, while the B layers had a nominally constant thickness across the thickness of the film. The feedblock and die were held at a target temp of 285° C. The extruded layers were cast onto a casting wheel run at about 50° C. to produce a cast web.

| Cast Web Number | A Layer Material | A Layers Feed Rate (Lbs/hr) | B Layer Material | B Layers Feed Rate (Lbs/hr) | C Layer Material | C Layers Feed Rate (Lbs/hr) |
|---|---|---|---|---|---|---|
| W1 | Low Melt PEN | 10 | KRATON G1657 | 5 | sPS | 7 |
| W2 | Low Melt PEN | 10 | KRATON G1657 | 4 | sPS | 7 |
| W3 | Low Melt PEN | 10 | KRATON G1657 | 3 | sPS | 7 |
| W4 | Low Melt PEN | 10 | KRATON G1657 | 2 | sPS | 7 |
| W5 | Low Melt PEN | 10 | KRATON G1657 | 2 | sPS | 7 |
| W6 | Low Melt PEN | 10 | PETG | 5 | sPS | 7 |
| W7 | Low Melt PEN | 10 | sPS | 5 | Low Melt PEN | 10 |
| W8 | PEN | 10 | KRATON G1645 | 5 | sPS | 7 |
| W9 | PEN/PET | 10 | KRATON G1645 | 5 | sPS | 7 |

These cast webs were then oriented using a KARO batch orienter (available from Brückner Maschinenbau Gmbh & Co. KG, Siegsdorf, Germany) at a stretch temperature indicated in the table below and at a stretch rate of 50 percent per second. Substantially uniaxially oriented films were made with draw ratios of 1.5 (machine direction) by 5 or 6 (transverse direction) and biaxially oriented films were made with draw ratios of 3 by 3. The draw ratios used for the various optical films are indicated in the table below.

Interlayer adhesion of each of the optical films indicated in the table below was measured as generally described for FIG. 16. The optical film was cut into 1 inch wide samples and laminated to a glass substrate 360 with double sided tape (SCOTCH Double-Sided Tape available from 3M Company, St. Paul, MN) 151. Then a razor blade was used to form a cut 170 into the optical film 300. A piece of tape 152 was used to peel an end 333 of a portion of the optical film 300 adjacent the cut 170 from a remaining portion of the optical film 300. The interlayer adhesion was then measured using an IMASS SP-2100 (IMASS, inc. Accord, MA) with a 10 pound load cell to measure a 90 degree peel. The pull speed was set to 12 inches per minute and the peel force was averaged for 5 seconds after a 2 second delay. This was repeated 4 times. The average was taken and reported as the interlayer adhesion. Results are provided in the following table. Web W7 utilized Low Melt PEN as both the A and the C layers and utilized sPS as the B layers in order to test the interlayer adhesion between Low Melt PEN and sPS.

| Example | Cast Web Number | Draw Ratio | Stretch Temperature in ° C. | A Layers | B Layers | C Layers | Interlayer Adhesion (g/in) |
|---|---|---|---|---|---|---|---|
| 1 | W1 | 1.5 × 5 | 135 | Low Melt PEN | KRATON G1657 | sPS | 20.3 |
| 2 | W2 | 1.5 × 5 | 135 | Low Melt PEN | KRATON G1657 | sPS | 19.8 |
| 3 | W3 | 1.5 × 5 | 135 | Low Melt PEN | KRATON G1657 | sPS | 19.0 |
| 4 | W4 | 1.5 × 5 | 135 | Low Melt PEN | KRATON G1657 | sPS | 20.8 |
| 5 | W5 | 1.5 × 5 | 135 | Low Melt PEN | KRATON G1657 | sPS | 15.8 |
| 6 | W6 | 1.5 × 5 | 135 | Low Melt PEN | PETG | sPS | 14.0 |
| CE1 | W7 | 1.5 × 5 | 135 | Low Melt PEN | sPS | Low Melt PEN | 12.0 |
| 7 | W8 | 1.5 × 5 | 135 | PEN | KRATON G1645 | sPS | 37.3 |
| 8 | W9 | 1.5 × 5 | 115 | PEN/PET | KRATON G1645 | sPS | 65.0 |

-continued

| Example | Cast Web Number | Draw Ratio | Stretch Temperature in ° C. | A Layers | B Layers | C Layers | Interlayer Adhesion (g/in) |
|---|---|---|---|---|---|---|---|
| 9 | W9 | 1.5 × 5 | 135 | PEN/PET | KRATON G1645 | sPS | 33.0 |
| 10 | W9 | 1.5 × 5 | 120 | PEN/PET | KRATON G1645 | sPS | 35.3 |
| 11 | W9 | 1.5 × 6 | 135 | PEN/PET | KRATON G1645 | sPS | 54.5 |
| 12 | W8 | 1.5 × 6 | 135 | PEN | KRATON G1645 | sPS | 45.8 |
| CE2 | W7 | 1.5 × 6 | 135 | Low Melt PEN | sPS | Low Melt PEN | 15.3 |
| 13 | W1 | 3 × 3 | 135 | Low Melt PEN | KRATON G1657 | sPS | 16.3 |
| 14 | W2 | 3 × 3 | 135 | Low Melt PEN | KRATON G1657 | sPS | 16.8 |
| 15 | W3 | 3 × 3 | 135 | Low Melt PEN | KRATON G1657 | sPS | 15.8 |
| 16 | W4 | 3 × 3 | 135 | Low Melt PEN | KRATON G1657 | sPS | 18.3 |
| 17 | W5 | 3 × 3 | 135 | Low Melt PEN | KRATON G1657 | sPS | 25.8 |
| 18 | W6 | 3 × 3 | 135 | Low Melt PEN | PETG | sPS | 27.3 |
| CE3 | W7 | 3 × 3 | 135 | Low Melt PEN | sPS | Low Melt PEN | 10.8 |
| 19 | W8 | 3 × 3 | 135 | PEN | KRATON G1645 | sPS | 33.0 |
| 20 | W9 | 3 × 3 | 135 | PEN/PET | KRATON G1645 | sPS | 32.0 |
| 21 | W9 | 3 × 3 | 120 | PEN/PET | KRATON G1645 | sPS | 85.3 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A reflective polarizer comprising a plurality of optical repeat units disposed between first and second skin layers, each optical repeat unit comprising at least one polymeric A layer, at least two B layers, and at least one polymeric C layer, each pair of adjacent A and C layers having at least one of the two B layers disposed therebetween, a total number of the A and C layers in the plurality of optical repeat units disposed between the first and second skin layers being less than about 400, each of the A and C layers having an average thickness of between about 50 nm and about 500 nm, each of the B layers having an average thickness of less than about 50 nm, each of the first and second skin layers having an average thickness of greater than about 500 nm, the reflective polarizer having an average thickness of less than about 20 micrometers, such that for a light incident on the reflective polarizer in an incident plane, for each of a first incident angle less than about 5 degrees and a second incident angle greater than about 40 degrees, and for a visible wavelength range extending from about 420 nm to about 680 nm, the plurality of optical repeat units has an average optical transmittance of:

less than about 10% for an s-polarization state when an in-plane first direction of the reflective polarizer lies in the incident plane; and greater than about 65% for a p-polarization state when an in-plane orthogonal second direction of the reflective polarizer lies in the incident plane, wherein each polymeric A layer comprises polyethylene naphthalate, polyethylene terephthalate, copolyethylene naphthalate terephthalate copolymer, or polyhexylethylene naphthalate copolymer; each B layer comprises styrenic block copolymer, acrylic block copolymer, glycol-modified polyethylene terephthalate, glycol-modified polyethylene naphthalate, polymethylmethacrylate, or a copolymer of methyl methacrylate and ethyl acrylate; and each polymeric C layer comprises syndiotactic polystyrene or a terpolymer of tetrafluoroethylene, hexafluoropropylene and vinylidene fluoride, and wherein an interlayer adhesion of the individual layers in the plurality of optical repeat units is at least about 14 grams per inch when measured at a 90 degree peel angle.

2. The reflective polarizer of claim 1, wherein when the in-plane second direction of the reflective polarizer lies in the incident plane and for the visible wavelength range and the p-polarization state, the plurality of optical repeat units has average optical transmittances T1 and T2 for the respective first and second incident angles, T2 greater than T1 by at least 5%.

3. The reflective polarizer of claim 1, wherein for each of the first and second incident angles, for the s-polarization state and the first direction lying in the incident plane and for the p-polarization state and the second direction lying in the incident plane, and for an infrared wavelength range extending from about 750 nm to about 1200 nm, the plurality of optical repeat units has an average optical transmittance of greater than about 40%.

4. The reflective polarizer of claim 1, wherein for each of the first and second incident angles, for each of the s- and p-polarization states, for each of the first and second directions lying in the incident plane, and for an infrared wavelength range extending from about 750 nm to about 1200 nm, the plurality of optical repeat units has an average optical transmittance of greater than about 40%.

5. The reflective polarizer of claim 1, wherein for the first direction lying in the incident plane and for the s-polarization state, the plurality of optical repeat units has first and second optical transmittances versus wavelength for the respective first and second incident angles, the first and second optical transmittances comprising respective first and second transmission band edges, wherein a best linear fit to each of the first and second band edges at least across a wavelength range along the transmission band edge where the optical transmittance increases from about 10% to about 50%, has a positive slope of greater than about 1.3%/nm.

6. The reflective polarizer of claim 1, wherein each polymeric A layer comprises polyethylene naphthalate, polyethylene terephthalate, or polyhexylethylene naphthalate copolymer; each B layer comprises polymethylmethacrylate or the copolymer of methyl methacrylate and ethyl acrylate; and each polymeric C layer comprises the terpolymer of tetrafluoroethylene, hexafluoropropylene and vinylidene fluoride.

7. The reflective polarizer of claim 1, wherein the interlayer adhesion of individual layers in the plurality of optical repeat units is at least about 20 grams per inch when measured at a 90 degree peel angle.

8. The multilayer film of claim 1, wherein each polymeric A layer comprises polyethylene naphthalate; each B layer comprises styrenic block copolymer; and each polymeric C layer comprises syndiotactic polystyrene.

9. A multilayer optical film comprising a plurality of optical repeat units, the optical repeat units in the plurality of optical repeat units numbering less than about 175 in total and having a combined average thickness of less than about 20 micrometers, each of the optical repeat units comprising at least four individual layers, at least first and second individual layers in the at least four individual layers of each of the optical repeat units having respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions, wherein for at least one wavelength in a visible wavelength range extending from about 420 nm to about 680 nm:

nx1 is greater than at least one of ny1 and nz1 by at least 0.15;

a magnitude of a maximum difference between nx2, ny2 and nz2 is less than 0.15; and nx1 is greater than nx2 by at least 0.15;

wherein at least a third layer in the at least four individual layers of each of the optical repeat units has an average thickness of less than about 50 nm, and wherein an interlayer adhesion of the individual layers in the plurality of optical repeat units is at least about 14 grams per inch when measured at a 90 degree peel angle, wherein for each optical repeat unit:

the first individual layer comprises polyethylene naphthalate, polyethylene terephthalate, or polyhexylethylene naphthalate copolymer;

the second individual layer comprises syndiotactic polystyrene or a terpolymer of tetrafluoroethylene, hexafluoropropylene and vinylidene fluoride; and the at least the third layer comprises styrenic block copolymer, acrylic block copolymer, glycol-modified polyethylene terephthalate, glycol-modified polyethylene naphthalate, polymethylmethacrylate, a copolymer of methyl methacrylate and ethyl acrylate, or a copolyethylene naphthalate terephthalate copolymer.

10. The multilayer optical film of claim 9, wherein the at least the third layer has respective indices of refraction nx3, ny3 and nz3 along the respective x-, y- and z-directions, and wherein for the at least one wavelength, nx2 is greater than nx3 by at least 0.005 or nx3 is greater than nx2 by at least 0.05.

11. The multilayer optical film of claim 9, wherein for each optical repeat unit:

the first individual layer comprises polyethylene naphthalate or polyhexylethylene naphthalate copolymer.

12. The multilayer optical film of claim 9, wherein for each optical repeat unit:

the first individual layer comprises polyethylene terephthalate;

the second individual layer comprises the terpolymer of tetrafluoroethylene, hexafluoropropylene and vinylidene fluoride; and the at least the third layer comprises the copolymer of methyl methacrylate and ethyl acrylate.

13. The multilayer optical film of claim 9, wherein for each optical repeat unit, the at least the third layer comprises styrenic block copolymer or glycol-modified polyethylene terephthalate.

14. The multilayer optical film of claim 9, wherein for the at least one wavelength, nx1 is greater than each of ny1 and nz1 by at least 0.15.

15. The multilayer optical film of claim 9, wherein for the at least one wavelength, nx1 is greater than one, but not the other, of ny1 and nz1 by at least 0.15.

16. A multilayer optical film comprising a plurality of optical repeat units, the optical repeat units in the plurality of optical repeat units numbering less than about 175 in total and having a combined average thickness of less than about 20 micrometers, each of the optical repeat units comprising at least four individual layers, at least first and second individual layers in the at least four individual layers of each of the optical repeat units having respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions, wherein for at least one wavelength in a visible wavelength range extending from about 420 nm to about 680 nm:

a magnitude of a maximum difference between nx1, ny1 and nz1 is less than 0.05;

nx2 is less than at least one of ny2 and nz2; and nx1 is greater than nx2 by at least 0.07;

wherein at least a third layer in the at least four individual layers of each of the optical repeat units has an average thickness of less than about 50 nm, and wherein an interlayer adhesion of the individual layers in the plurality of optical repeat units is at least about 14 grams per inch when measured at a 90 degree peel angle, and wherein for each optical repeat unit:

the first individual layer comprises a copolyethylene naphthalate terephthalate copolymer or a polyhexylethylene naphthalate copolymer;

the second individual layer comprises syndiotactic polystyrene; and the at least the third layer comprises styrenic block copolymer.

17. The multilayer optical film of claim 16, wherein the interlayer adhesion of the individual layers in the plurality of optical repeat units is greater than about 20 grams per inch when measured at a 90 degree peel angle.

18. The multilayer optical film of claim 16, wherein for the at least one wavelength, nx2 is less than each of ny2 and nz2 by at least 0.05.

19. The multilayer optical film of claim 16, wherein for the at least one wavelength, nx2 is less than nz2 by at least 0.03 and |nx2-ny2|<0.005.

20. The multilayer optical film of claim 16, wherein for each optical repeat unit:

the first individual layer comprises the polyhexylethylene naphthalate copolymer.

* * * * *